(12) United States Patent
Kang et al.

(10) Patent No.: US 9,699,524 B2
(45) Date of Patent: Jul. 4, 2017

(54) SIGNAL TRANSMITTING APPARATUS, SIGNAL TRANSMITTING METHOD, AND SYSTEM FOR TRANSMITTING AND RECEIVING SIGNAL

(71) Applicant: LG ELECTRONICS INC., Seoul (KR)

(72) Inventors: Donghyun Kang, Seoul (KR); Seonah Lee, Seoul (KR); Sejin Oh, Seoul (KR); Jongsung Choi, Seoul (KR); Younghwan Kwon, Seoul (KR); Seungjoo An, Seoul (KR); Jungwook Park, Seoul (KR); Jinpil Kim, Seoul (KR); Seungryul Yang, Seoul (KR); Kyoungsoo Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/766,681

(22) PCT Filed: Mar. 19, 2014

(86) PCT No.: PCT/KR2014/002306
§ 371 (c)(1),
(2) Date: Aug. 7, 2015

(87) PCT Pub. No.: WO2014/148813
PCT Pub. Date: Sep. 25, 2014

(65) Prior Publication Data
US 2015/0382080 A1    Dec. 31, 2015

Related U.S. Application Data

(60) Provisional application No. 61/837,187, filed on Jun. 20, 2013, provisional application No. 61/836,165, (Continued)

(51) Int. Cl.
*H04N 21/858* (2011.01)
*H04N 21/41* (2011.01)
(Continued)

(52) U.S. Cl.
CPC ....... *H04N 21/858* (2013.01); *H04N 21/4126* (2013.01); *H04N 21/437* (2013.01);
(Continued)

(58) Field of Classification Search
None
See application file for complete search history.

(56) References Cited

U.S. PATENT DOCUMENTS

2005/0273832 A1    12/2005    Zigmond et al.
2006/0041924 A1*    2/2006    Bushmitch ....... H04N 21/43615
                                                                    709/201

(Continued)

FOREIGN PATENT DOCUMENTS

JP    2006-526909 A    11/2006
JP    2010-239360 A    10/2010

(Continued)

OTHER PUBLICATIONS

Fujisawa, H., et al., "HYBRIDCAST ; Advanced Hybrid Broadcast and Broadband System," International Broadcasting Conference 2012, Amsterdam, Sep. 2012, 10 pages, [XP030082407].

(Continued)

*Primary Examiner* — Omar S Parra
(74) *Attorney, Agent, or Firm* — Dentons US LLP

(57) ABSTRACT

Disclosed are a signal transmitting method, a signal transmitting apparatus, and a system for transmitting and receiving a signal. The signal transmitting method comprises the steps of: discovering a companion device using a multicast mode; receiving and storing device type information from the discovered companion device; receiving an application (Continued)

uniform resource identifier (URI) and storing the application URI to correspond to the device type information; and identifying the device type information of the companion device selected by a user and transmitting to the selected companion device the application URI corresponding to the device type information.

12 Claims, 31 Drawing Sheets

Related U.S. Application Data filed on Jun. 18, 2013, provisional application No. 61/830,642, filed on Jun. 4, 2013, provisional application No. 61/803,116, filed on Mar. 19, 2013.

(51) Int. Cl.
    *H04N 21/436* (2011.01)
    *H04N 21/4363* (2011.01)
    *H04N 21/443* (2011.01)
    *H04N 21/437* (2011.01)
    *H04N 21/6405* (2011.01)
    *H04N 21/81* (2011.01)

(52) U.S. Cl.
    CPC . *H04N 21/43615* (2013.01); *H04N 21/43637* (2013.01); *H04N 21/4432* (2013.01); *H04N 21/6405* (2013.01); *H04N 21/8133* (2013.01); *H04N 21/8173* (2013.01)

(56) References Cited

U.S. PATENT DOCUMENTS

| 2010/0293598 | A1 | 11/2010 | Collart et al. |
| 2011/0167468 | A1 | 7/2011 | Lee et al. |
| 2014/0165112 | A1* | 6/2014 | Freeman ............ H04N 21/4122 725/81 |

FOREIGN PATENT DOCUMENTS

| JP | 2012-244339 A | 12/2012 |
| JP | 2013-009355 A | 1/2013 |
| KR | 10-2003-0036305 A | 5/2003 |
| KR | 10-0658895 B1 | 12/2006 |
| KR | 10-2009-0123544 A | 12/2009 |
| KR | 10-2012-0063798 A | 6/2012 |
| WO | 2004-088983 A2 | 10/2004 |
| WO | 2013031556 A1 | 3/2013 |
| WO | 2014-021624 A1 | 2/2014 |
| WO | 2014-194126 A1 | 12/2014 |

OTHER PUBLICATIONS

"Hybrid Broadcast Broadband TV," Technical Specification, European Telecommunications Standards Institute (ETSI), France, vol. BROADCAS, No. V1.2.1, Nov. 2012, 88 pages, [XP014092699].

* cited by examiner

FIG. 14

| Syntax | No of bits | Identifier |
|---|---|---|
| companion_screen_single_URI_descriptor(){ | | |
|   descriptor_tag | 8 | uimsbf |
|   descriptor_length | 8 | uimsbf |
|   URI_length | | |
|   for(i=0; i<N; i++){ | 16 | uimsbf |
|     URI_char | | |
|   } | 8 | uimsbf |
| } | | |

FIG. 15

| Syntax | No of bits | Identifier |
|---|---|---|
| companion_screen_multi_URI_descriptor(){ | | |
|   descriptor_tag | 8 | uimsbf |
|   descriptor_length | 8 | uimsbf |
|   device_number | 16 | uimsbf |
|   for(i=0; i<N; i++){ | | |
|     device_type | 8 | bslbf |
|     URI_length | 16 | uimsbf |
|     for(j=0; j<M; j++){ | | |
|       URI_char | 8 | uimsbf |
|     } | | |
|   } | | |

FIG. 16

| device_type | Definition |
|---|---|
| 0 | The Companion Screen Device is PC class |
| 1 | The Companion Screen Device is Tablet class |
| 2 | The Companion Screen Device is Smart Phone class |
| 3 | Reserved |

FIG. 17

| Syntax | Number of Bits | Mnemonic |
|---|---|---|
| companion_link_info() {<br>   link_target_type<br>   display_intent<br>   reserved<br>} | <br>8<br>2<br>6 | <br>uimsbf<br>uimsbf<br>bslbf |

FIG. 18

| link_target_type | Description |
|---|---|
| 0x00 | The URI is a deferred URI |
| 0x01 | The URI is a generic URI targeting all device classes. |
| 0x02 | The URI is a specific URI targeting devices of the Smartphone class. |
| 0x03 | The URI is a specific URI targeting devices of the Tablet class. |
| 0x04 | The URI is a specific URI targeting devices of the TV class. |
| 0x05 | The URI is a specific URI targeting devices of the PC class. |
| 0x06 to 0xFF | reserved for future use |

FIG. 19

| display_intent | Definition |
|---|---|
| 0 | Companion application is intended for display in the system Web browser |
| 1 | Companion application is intended for display in an embedded WebView |
| 2 to 3 | reserved for future use |

FIG. 20

| Request Header | M(andatory) or O(ptional) | Description |
|---|---|---|
| Accept | M | This header shall be set to application/json |
| Accept-Charset | M | This header shall be set to utf-8 |
| Host | M | This header shall be set to the host part of the deferred URI conveyed in the uri_linkage_descriptor. |
| User-Agent | M | This header shall be set to the usual user agent string that is used when a link is followed from an HbbTV application. |
| If-Modified-Since | O | This header should be encoded to enable efficient use of caches. |

FIG. 21

| Status Code | Description |
|---|---|
| 200 OK | Indicates that the response contains a JSON entity as defined below. |
| 301 Moved Permanently | Indicates that this and all future requests should be directed to the given URI. |
| 304 Not Modified | Indicates that the resource has not been modified since the version specified by the request header If-Modified-Since. This means that there is no need to retransmit the resource, since the client still has a previously downloaded copy. |
| 307 Temporary Redirect | Indicates that the request should be repeated with another URI. Future requests shall still use the original URI. |
| 404 Not Found | The requested resource could not be found but may be available again in the future. Subsequent requests by the client are permissible. |

FIG. 22

```
{
    "$schema": "http://json-schema.org/schema#",
    "title": "AppLaunchUriList",
    "description": "When the URI for launching a Web application between a shared and a personal device is retrieved from a remote server, the server uses this structure in its response",
    "type": "array",
    "minItems": 1,
    "items": {
        "title": "AppLaunchUri",
        "type": "object",
        "properties": {
            "target": {
    "description": "Indicates the class of device to which the URI is applicable. The special redirect value is used to indicate that the URI points to another server to query.",
            "enum": [ "All", "Phone", "Tablet", "TV", "PC" ]
            },
            "uri": {
            "description": "The URI to launch.",
            "type": "string",
            "format": "uri"
            }
        },
        "required": [ "target", "uri" ]
    }
}
```

FIG. 23

```
[
    {
        "target": "Phone",
        "uri": "https://broadcaster.com/apps/quizshow/smartphone.html"
    },
    {
        "target": "Tablet",
        "uri": "https://broadcaster.com/apps/quizshow/tablet.html"
    }
]
```

SIGNAL TRANSMITTING APPARATUS, SIGNAL TRANSMITTING METHOD, AND SYSTEM FOR TRANSMITTING AND RECEIVING SIGNAL

This application is a National Stage Application of International Application No. PCT/KR2014/002306, filed Mar. 19, 2014, which claims the priority to and benefit of U.S. Provisional Application Nos. 61/837,187, filed Jun. 20, 2013, 61/836,165 filed Jun. 18, 2013, 61/830,642 filed Jun. 4, 2013, and 61/803,116 filed Mar. 19, 2013, all of which are hereby incorporated by reference in their entirety for all purposes as if fully set forth herein.

TECHNICAL FIELD

The present invention relates to a signal transmission apparatus, a signal transmission method and a signal transmission and reception system.

BACKGROUND ART

With development of broadcast and communication technology, research into various broadcast apparatuses and broadcast services has been conducted. Currently, a broadcast apparatus and broadcast service connected to an Internet protocol network to receive new content via the Internet protocol network is implemented. Such a broadcast apparatus receives an additional service suitable for a broadcast program provided by a broadcaster via the Internet protocol network and outputs the additional service on a screen.

However, when additional service content is output on a screen while outputting broadcast content, the additional service content obstructs the screen for outputting the broadcast content. In general, a plurality of persons may view broadcast content using one broadcast apparatus. However, only some persons may pay attention to the additional service.

Accordingly, there is a need for technology of outputting an additional service via a peripheral device and outputting broadcast content via a broadcast apparatus without obstruction.

DISCLOSURE

Technical Problem

An object of the present invention devised to solve the problem lies in a signal transmission apparatus, a signal transmission method and a signal transmission and reception system, which are capable of outputting an additional service to a peripheral device while viewing broadcast content.

Another object of the present invention devised to solve the problem lies in a signal transmission apparatus, a signal transmission method and a signal transmission and reception system, which are capable of identifying a peripheral device capable of receiving an additional service and transmitting, to the peripheral device, information indicating that the additional service may be provided.

Another object of the present invention devised to solve the problem lies in a signal transmission apparatus, a signal transmission method and a signal transmission and reception system, which are capable of outputting an additional service provided by a peripheral device.

Technical Solution

The object of the present invention can be achieved by providing a signal transmission method including discovering a companion device using a multicast method, receiving and storing device type information from the discovered companion device, receiving and storing an application uniform resource identifier (URI) in correspondence with the device type information, and identifying the device type information of a companion device selected by a user and transmitting the application URI corresponding to the device type information to the selected companion device.

The storing the application URI may include receiving an application information table (AIT) including the application URI, parsing the received AIT, and detecting and storing the application URI corresponding to the device type information.

The storing the application URI may include receiving an application information table (AIT) including a deferred URI, parsing the received AIT to detect the deferred URI, accessing a server corresponding to the deferred URI, and receiving and storing the application URI corresponding to the device type information.

The storing the application URI may include performing communication with a server via an HbbTV application to identify whether a companion device application is available and receiving and storing the application URI corresponding to the device type information of the companion device selected by the user from the server.

The application URI may be specific URI in which a different URI value is assigned to each companion device or a generic URI in which the same URI value is assigned to all companion devices.

In another aspect of the present invention, provided herein is a signal transmission apparatus including a UPnP unit configured to discover a companion device using a multicast method and to receive type information from the discovered companion device, a communication unit configured to receive an application uniform resource identifier (URI), and a device manager configured to store the device type information in correspondence with the device type information and to identify the device type information of a companion device selected by a user, wherein the UPnP unit transmits the application URI corresponding to the device type information to the selected companion device.

In another aspect of the present invention, provided herein is a signal transmission and reception system including a signal transmission apparatus configured to discover a companion device using a multicast method and to transmit a control signal for requesting device type information to the discovered companion device, and the companion device configured to transmit the device type information to the signal transmission apparatus, wherein the signal transmission apparatus receives an application URI, stores the application URI in correspondence with the device type information, identifies the device type information of a companion device selected by a user, and transmits the application URI corresponding to the device type information to the selected companion device, and wherein the companion device receives the application URI from the signal transmission apparatus and receives and displays a URI page from a server corresponding to the application URI.

Advantageous Effects

According to the embodiments of the present invention, a peripheral device can receive and output an additional service related to broadcast content.

It is possible to identify a peripheral device capable of receiving an additional service and to transmit, to the peripheral device, information indicating that the additional service may be provided.

According to the embodiments of the present invention, a signal transmission apparatus can output an additional service provided by a peripheral device.

DESCRIPTION OF DRAWINGS

FIG. 14 is a diagram illustrating a URI descriptor according to one embodiment of the present invention.

FIG. 15 is a diagram illustrating a URI descriptor according to another embodiment of the present invention.

FIG. 16 is a diagram showing an embodiment of signaling device type information.

FIG. 17 is a diagram illustrating an embodiment of signaling companion device information.

FIG. 18 is a diagram illustrating an embodiment of signaling URI type information.

FIG. 19 is a diagram illustrating an embodiment of signaling information on a method of executing a companion application.

FIG. 20 is a diagram illustrating GET request header information of a deferred URI according to one embodiment of the present invention.

FIG. 21 is a diagram illustrating GET response information according to one embodiment of the present invention.

FIG. 22 is a diagram illustrating JSON schema for encoding a companion application URI according to one embodiment of the present invention.

FIG. 23 is a diagram illustrating an embodiment of encoding a URI according to a companion device.

BEST MODE

Figure 1:
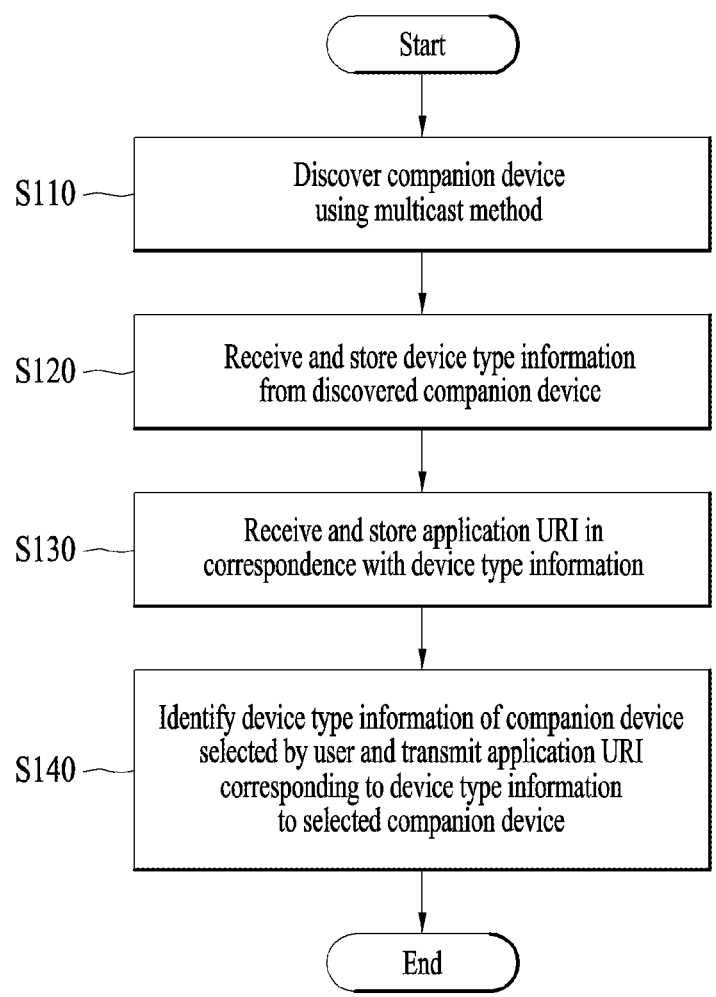
FIG. 1 is a flowchart illustrating a signal transmission method according to one embodiment of the present invention.

Hereinafter, exemplary embodiments of the present invention capable of realizing the above-described objects will be described with reference to the accompanying drawings. The configuration and operation of the present invention shown in the drawings and described hereinafter will be described in at least one embodiment, without limiting the spirit and scope of the present invention.

Although the terms used in the present invention are selected from generally known and used terms, terms used herein may vary depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

FIG. 1 is a flowchart illustrating a signal transmission method according to one embodiment of the present invention.

Referring to FIG. 1, the signal transmission apparatus discovers a companion device (or a second device) using a multicast method (S110). For example, the signal transmission apparatus may be a TV, etc. The companion device may be a personal portable device such as a smartphone, a smart pad, a laptop, etc.

The signal transmission apparatus receives and stores device type information from the discovered companion device (S120). The device type information may identify which portable device is used as the companion device. The signal transmission apparatus may receive, store and manage the device type information in a device table.

The signal transmission apparatus receives and stores an application uniform resource identifier (URI) in correspondence with the device type information (S130). The URI is the address of a resource on the Internet and may include a uniform resource locator (URL) and a uniform resource name (URN). The application URI may be a place where a resource necessary for a companion device to perform an additional service is located.

As one embodiment, the signal transmission apparatus may receive an application information table (AIT) including the application URI, parse the received AIT and detect and store the application URI corresponding to the device type information.

Alternatively, the signal transmission apparatus may receive an AIT including a deferred URI and parse the received AIT to detect the deferred URI. The signal transmission apparatus may access a server corresponding to the deferred URI and receive and store the application URI corresponding to the device type information.

Alternatively, the signal transmission apparatus may perform communication with a server via an HbbTV application to identify whether a companion device application is available. The signal transmission apparatus may receive and store the application URI corresponding to the device type information of the companion device selected by the user from the server.

The signal transmission apparatus identifies the device type information of the companion device selected by the user and transmits the application URI corresponding to the device type information to the selected companion device (S140).

Figure 2:
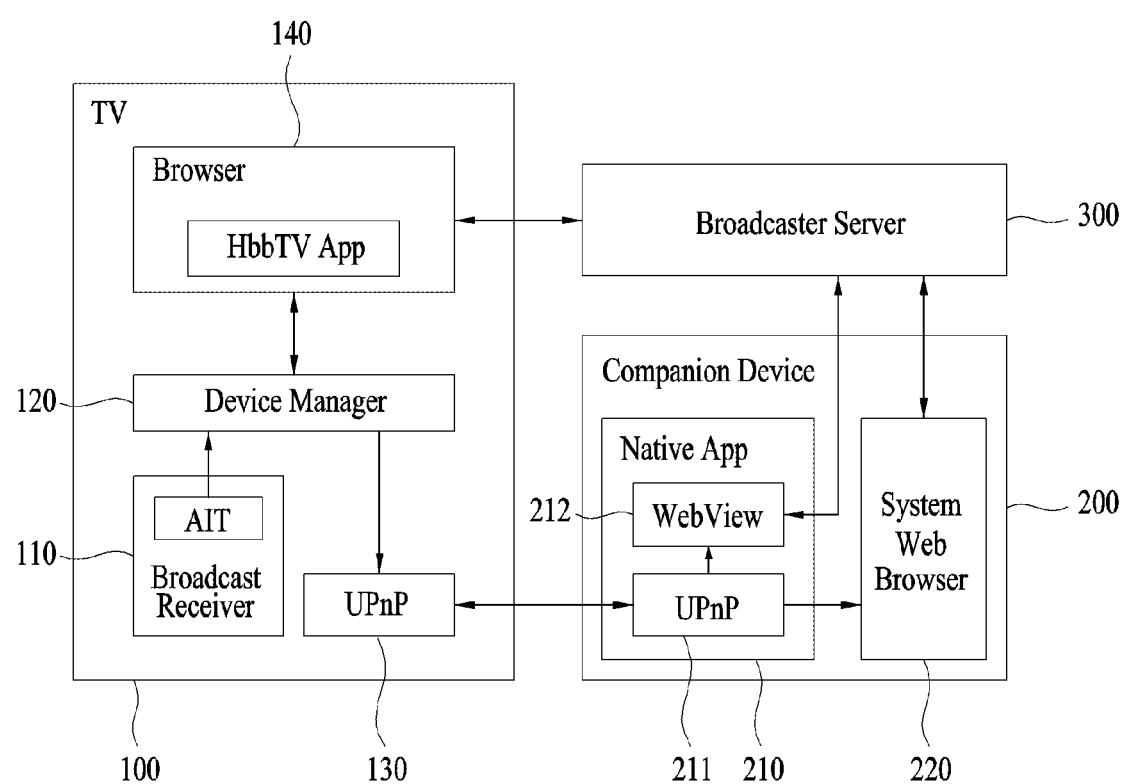
FIG. 2 is a diagram illustrating a signal transmission and reception system according to one embodiment of the present invention.

FIG. 2 is a diagram illustrating a signal transmission and reception system according to one embodiment of the present invention.

The signal transmission and reception system may include a signal transmission apparatus 100, a companion device 200 and a broadcast server 300.

The signal transmission apparatus 100 may include a broadcast receiver 110, a device manager 120, a UPnP unit 130 and a browser 140. For example, the signal transmission apparatus 100 may be a TV.

The companion device 200 may include a native application 210 and a system web browser 220. The native application 210 may include a UPnP unit 111 and a web view unit 212.

The signal transmission apparatus 100 may receive an AIT including information indicating that a companion device application service related to a current broadcast program exists via the broadcast receiver 110. Alternatively, the signal transmission apparatus 100 may recognize presence of the companion device application via an HbbTV application.

That is, the signal transmission apparatus 100 may trigger such a process while receiving the AIT including information indicating presence/absence of the companion device application related to the current program from the broadcast. The signal transmission apparatus 100 may notify a user that the application related to the current program is available. A process of finding a URI in order to install a companion device application may be performed directly using a URI included in the AIT or via a remote broadcast server 300 capable of utilizing the companion device application. (The process is triggered by the TV receiving an AIT from the broadcast, which contains information that there is a companion device application related to the current program. Then, users are notified that an associated application is available. The resolution process for finding the URI to launch the application can be either direct (URI given in the AIT), or defer to querying a remote Broadcast Server for availability of the application.)

The broadcast receiver 110 may receive a broadcast signal including broadcast content.

The broadcast receiver 110 represents the TV middleware of the platform. The broadcast receiver 110 may filter the broadcast AIT for a link to the companion device and notifies the device manager 120 if such link is found. (The Broadcast Receiver represents the TV middleware of the platform. It filters the broadcast AIT for links to companion applications and notifies the Device Manager if any such link is found. The interface between the Broadcast Receiver and the Device Manager is outside the scope of the present document.)

The device manager 120 may collect information about available devices from the UPnP unit 130 and expose the collected information to the HbbTV application through a JavaScript API. The device manager 120 may collect information about a companion application link provided in the AIT from the broadcast receiver 110 and notifies the HbbTV application of availability by firing a DOM event. (The Device Manager collects information about the available devices from the UPnP instance and exposes this information to HbbTV applications through a JavaScript API. It also collects information from the Broadcast Receiver about companion application links provided in the AIT, and notifies HbbTV applications about their availability by firing a DOM event.)

The UPnP unit 130 may implement UPnP of the TV platform. The UPnP unit 130 tracks presence of the companion device 200 and sends the companion application URI between the signal transmission apparatus 100 and the companion device 200. (The UPnP Instance is the UPnP implementation of the TV platform. It tracks the presence of companion devices, and sends companion app URIs between the TV and the companion device. Any APIs it provides are outside the scope of the present document.)

The browser 140 may include an HbbTV application. The browser 140 may access the broadcast server 300 of a specific URI using the HbbTV application. The browser 140 may receive the application URI according to the device type from the broadcast server 300. Alternatively, the browser 140 may identify whether the companion device application is available.

The native application 210 may run on the companion device 200 and provide UPnP implementation. In addition, the native application may provide the web view element capable of loading and running the companion application. (The Native App runs on the companion device and provides a UPnP implementation (as this is not usually part of Smartphone and similar platforms), and may also provide a WebView element with which it can load and run companion applications.)

The system web browser 220 may run on the companion device 200 and may be the standard web browser configured on the companion device 200. As opposed to the web view unit 212 optionally provided by the native application 210, the system web browser 220 may be a general web browser providing all features appropriate for general web usage. (The System Web Browser runs on the companion device and is the standard Web browser that is configured on the device. As opposed to the WebView optionally provided by the Native App, this is a general Web browser providing all the features appropriate for general Web usage. Note that embedded WebViews may provide restricted functionality on some platforms.)

The UPnP unit 211 may be connected to the UPnP unit 130 of the signal transmission apparatus 100 to perform communication and the web view unit 212 may display an additional service provided by the server of the connected URI.

The type of the URI acquired for the companion application may be considered as follows.

(1) The AIT may include a specific URI for each class of each companion device (e.g., smartphone, tablet, etc.) (The broadcast AIT contains a specific URI for each class of companion device (phone, tablet, etc.).)

(2) The AIT may include a generic URI applicable to all classes of the device. (The broadcast AIT contains a generic URI that is applicable to all classes of devices.)

(3) The AIT may include a deferred URI that points to a broadcast server capable of receiving an application URI. (The Broadcast AIT contains a deferred URI that points to a broadcaster server. In this case, the terminal will retrieve specific and/or generic URIs from the designated URI.)

Figure 3:
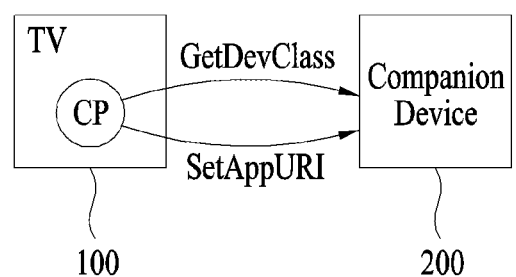
FIGS. 3 to 7 are diagrams illustrating a method of executing an additional service in a companion device according to various embodiments of the present invention.

FIG. 3 is a diagram illustrating a method of executing an additional service in a companion device when a control point (CP) according to one embodiment of the present invention is located in a signal transmission apparatus.

The UPnP device architecture may define that only control points can send commands to devices (control) or listen to state changes in devices (eventing). (The UPnP Device Architecture defines that only Control Points can send commands to devices (Control), or listen to state changes in devices (Eventing).)

Referring to FIG. 3, only the signal transmission apparatus 100 (e.g., TV) has a CP. The companion device 200 provides access to two state variables: the companion's device class and the URI to launch. Upon receiving the companion application URI included in the AIT, the signal transmission apparatus 100 can directly set the application URI via the service provided by the companion device 200. (FIG. 3 shows that only the TV has a Control Point, and the companion device provides access to two state variables: the companion's device class, and the URI to launch. In this case the TV, upon receiving a companion application URI in the broadcast AIT, can directly set the application URI via the service provided by the companion device.)

Figure 4:
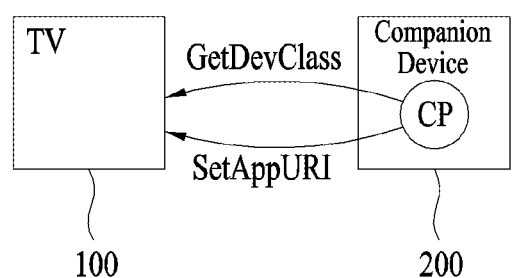

FIG. 4 is a diagram illustrating a method of executing an additional service in a companion device when a CP according to one embodiment of the present invention is located in a companion device.

Referring to FIG. 4, only the companion device 200 has a CP. The signal transmission apparatus 100 provides access to two state variables: the companion device class and the URI to launch. Since devices without a CP cannot invoke any services, the companion device 200 needs to actively set the device class thereof to the signal transmission apparatus 100 and then needs to poll the application URI service. (FIG. 4 shows that only the companion device has a Control Point, and the TV provides access to two state variables: the companion's device class, and the URI to launch. Since devices without a Control Point cannot invoke any services, the companion device needs to actively set it's device class to the TV, and then needs to constantly poll the application URI service for any results.)

The method illustrated in FIG. 4 may have the following two considerations.

First, use of a device class state variable in the signal transmission apparatus 100 is creative use of UPnP. UPnP may think of state variables as parameters that describe (GET) or control (SET) a peripheral. However, in this case, the state variable of the signal transmission apparatus 100 may be used to describe the companion device 200. Special handling needs to be implemented when the device class variable gets set, to store a separate value for each companion device 200. (First, the use of the device class state variable in the TV is a "creative use" of UPnP. Conceptually, UPnP thinks of state variables as parameters that describe (GET), or control (SET) a peripheral. In this use-case, the TV's state variable is used to describe the companion device. Hence, special handling needs to be implemented when the device class variable gets set, to store a separate value for each companion device. This would imply a special implementation of UPnP.)

Next, since the signal transmission apparatus 100 without the CP can never actively trigger an action, the companion device 200 needs to poll the application URI state variable. The UPnP device architecture defines that service invocation shall return after at most 30 seconds, and that if it is clear that the action will take longer should return earlier than that. This implies that it is at the signal transmission apparatus's discretion as to when to return from the service invocation when no trigger is present in the broadcast AIT. If the signal transmission apparatus 100 returns quickly in such cases, an unreasonable processing burden and system load may be imposed on the companion device 200 (Second, since the CP-less TV device can never actively trigger an action, the companion device needs to poll the application URI state variable. The UPnP device architecture defines that a service invocation shall return after at most 30 s, and that if it is clear that the action will take longer should return earlier than that. This implies that it is at the TV's discretion as to when to return from the service invocation when no trigger is present in the broadcast AIT. If the TV returns quickly in such cases, an unreasonable processing burden and system load may be imposed on the companion device.)

Figure 5:
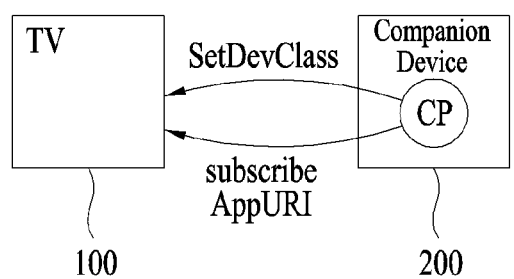

FIG. 5 is a diagram illustrating a method of executing an additional service in a companion device when a CP according to another embodiment of the present invention is located in a companion device.

Referring to FIG. 5, the application URI may be acquired from the signal transmission apparatus 100 via an event state variable. The method of FIG. 5 removes the polling penalty for the application URI state variable. (FIG. 5 shows a variation of FIG. 4, in which the application URI is obtained through an evented state variable from the TV. This removes the polling penalty for the application URI state variable.

The method of FIG. 5 uses "Set" such that the companion device 200 provides information to the signal transmission apparatus 100 and the method of FIG. 4 uses "Get" such that the signal transmission apparatus 100 gets information from the companion device 200.

Figure 6:
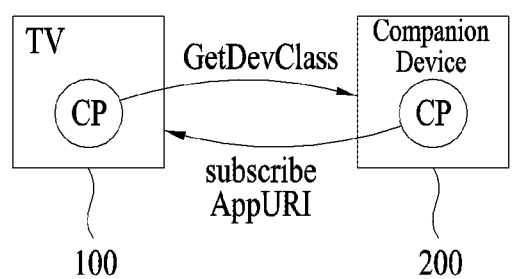

FIG. 6 is a diagram illustrating a method of executing an additional service in a companion device when a CP according to another embodiment of the present invention is located in both a signal transmission apparatus and a companion device.

Since the CP is located in both the signal transmission apparatus and the companion device, communication between the signal transmission apparatus and the companion device can be freely performed.

The companion device 200 may provide access to the device class thereof via a get-able state variable, and the signal transmission apparatus 100 provides access to the application URI via an event state variable. Whenever the signal transmission apparatus 100 detects a companion URI in the AIT, the signal transmission apparatus 100 generates an event for the application URI state variable. (The companion device provides access to its device class via a get-able state variable, and the TV provides access to the application URI via an evented state variable. Whenever the TV detects a companion URI in the broadcast AIT, it generates an event for the application URI state variable.)

The application URI state variable is "creative use" of event, since again the application URI would need to have a separate value per companion device 200, whereas UPnP defines that all subscribers are sent all event messages. (The application URI state variable is a "creative use" of eventing, since again the application URI would need to have a separate value per companion device, whereas UPnP defines that all subscribers are sent all event messages. This would imply a special implementation of UPnP.)

Figure 7:
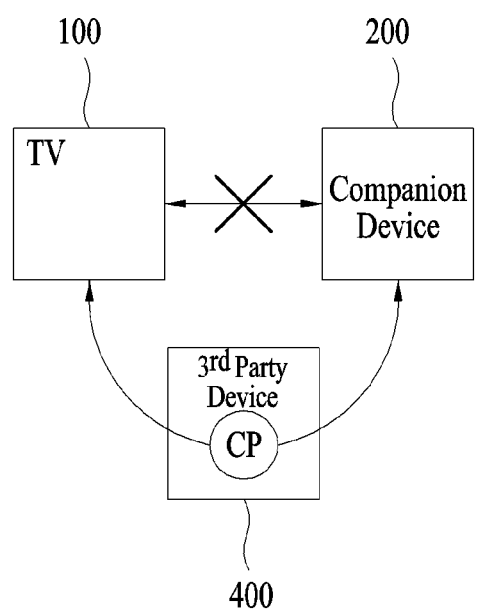

FIG. 7 is a diagram illustrating a method of executing an additional service in a companion device when a CP according to another embodiment of the present invention is located in a third party device.

Referring to FIG. 7, neither the signal transmission apparatus 100 nor the companion device 200 has a CP. Accordingly, the signal transmission apparatus 100 and the companion device 200 cannot perform communication with each other and a third party device 400 cannot be expected to act as a proxy. However, if a CP is included in at least one of the signal transmission apparatus 100 and the companion device 200, the signal transmission and reception system can operate using one of the methods shown in FIGS. 3 to 6. (FIG. 7 shows that neither the TV, nor the companion device has a Control Point, but only some 3rd party device has one. In this scenario, the TV and the companion device cannot communicate with each other, and the 3rd party device cannot be expected to act as a proxy. If a Control Point were added to the TV, or the companion device, or both, one of the use-cases described with reference to FIG. 3 through FIG. 6 would result.)

Figure 8:
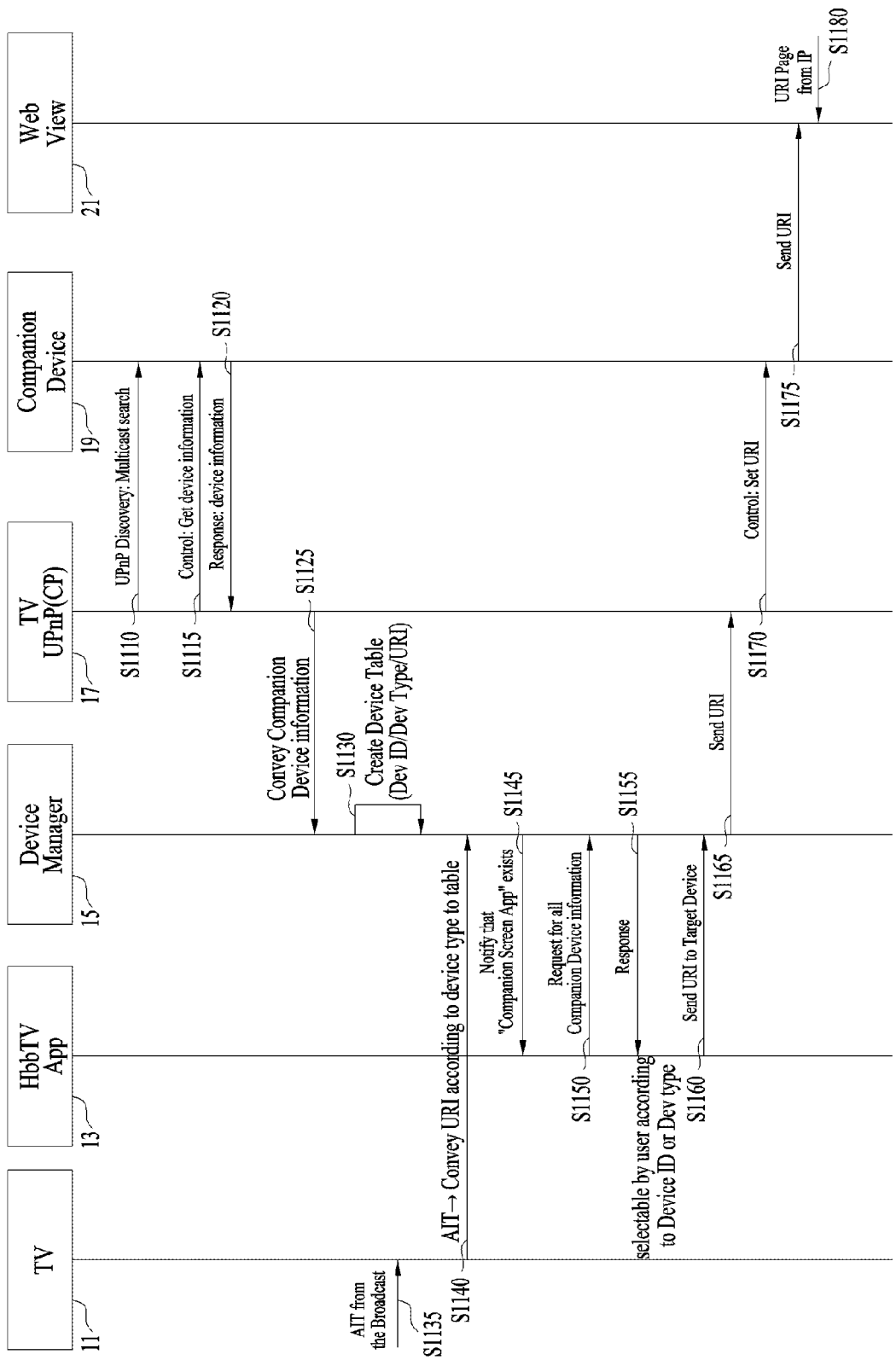
FIG. 8 is a timing chart illustrating a method of executing an additional service in a companion device according to a first embodiment of the present invention.

FIG. 8 is a timing chart illustrating a method of executing an additional service in a companion device according to a first embodiment of the present invention.

In FIG. 8, an embodiment in which the application URIs for all companion devices (or second devices) are included in the AIT and the CP is located in the signal transmission apparatus (e.g., TV) is shown.

FIG. 8 illustrates the flow of events when a specific URI or a generic URI is conveyed in the AIT. Accordingly, no further URI resolution is necessary, and the launching URI can be transferred to the companion device directly. (FIG. 8 depicts the flow of events when a specific or a generic URI is conveyed in the broadcast AIT. This means that no further URI resolution in the TV is necessary, and the launching URI can be transferred to the companion device directly.)

The TV, which is the CP, broadcasts a multicast search to a companion device 19 via the UPnNP unit 17 to begin a discovery process (S1110). When discovery of the companion device 19 is completed, the UPnP unit 17 transmits a control signal "Get" for obtaining device type information to the companion device 19 (S1115). The companion device 19 transmits device information to the UPnP unit 17 of the TV in response to the control signal (S1120). The transmitted device information is conveyed to the device manager 15 (S1125). The device manager 15 creates a device table and manages a device ID, a device type and a URI (S1130).

The TV 11 receives the AIT (S1135). The AIT may include an application URI to be launched in the companion device. The TV 11 parses the received AIT and sends the application URI according to the device type to the device manager 15 (S1140). The device manager 15 updates the URI corresponding to the companion device of the device table. The device manager 15 notifies an HbbTV application 13 that a companion screen application exists (S1145). The HbbTV application 13 requests all companion device information (S1150). The device manager 15 conveys the companion device information in response to the request (S1155).

The TV 11 notifies the user that the additional service exists if the additional service related to the currently broadcast program exists and the user may select the additional service and the type of a companion device for executing the additional service.

The HbbTV application 13 conveys the information related to the selected companion device to the device manager 15 (S1160). The device manager 15 sends the application URI corresponding to the selected companion device to the UPnP unit 17 of the TV (S1165). The UPnP unit 17 of the TV transmits a control signal "Set URI" to the selected companion device 19 (S1170). The companion device 19 sends the transmitted URI to the web view unit 21 (S1175). The web view unit 21 displays a URI page using the Internet protocol network (S1180).

In other words, the TV, which is the CP, broadcasts a multicast search to the companion devices via the UPnP unit to begin the discovery process. When discovery of the companion devices is completed, the TV sends a control signal "Get" for obtaining the device type to the companion device. The companion device conveys the device information in response to the control signal. The conveyed device information is conveyed to the device table of the device manger to manage the device ID and the device type. (The UPnP Control Point in the TV begins discovery by broadcasting a multicast search for available HbbTV companion devices. When discovery is completed, the Device Manager in the TV receives a list of available HbbTV companion devices, and sends a "GET" control to each HbbTV companion device to learn its name and device class. This information is stored in the Device Table by the Device Manager.)

The AIT contains one or more launching URIs for a companion device and the TV receives the AIT. The received AIT is parsed and conveyed to the device manager to update the URI corresponding to the companion device in the device table. The device table contains the application URI corresponding to the companion device. If the device type is not specified in the AIT (e.g., generic URI), the common URI is conveyed to the companion device. When the companion device application exists, via the TV, the user is notified that the companion device application is available via the AIT. The user identifies this information and selects a companion device to connect to. The selected device is conveyed to the device manager and is ready to send the launching URI to the companion device. (The AIT contains one or more launching URIs for a companion application, and the class of devices each URI is applicable to. The TV first receives the AIT from the broadcast, then searches the AIT for companion URI descriptors, and (if any are found) then sends these URIs to the Device Manager to update the URIs for all devices of the given device classes. Device Table is now storing all available HbbTV companion devices, their device class, and any application URI that is currently available for each device. If AIT contains a generic URI which does not specify which device class the URI is intended for, then all companion device classes share the same launching URI for the application. If none of the available HbbTV companion devices now have a launching URI associated therewith via the AIT, the process ends at this point. If one or more of the available HbbTV companion devices now do have a launching URI associated therewith via the AIT, the TV should prompt the user to select a device on which the companion application is to be launched. After a decision has been made—whether by consulting the user or otherwise—the TV is ready to send the launching URI to the selected HbbTV companion device.)

The device manager delivers the application URI corresponding to the companion device selected by the user to the UPnP unit of the TV. The delivered URI is conveyed to the companion device selected by the user via a control signal "Set URI". The received URI is displayed to the user on the companion device via the web view unit. (When the Device Manager is instructed by the HbbTV application on the TV to send the launching URI to the selected companion device, it will use the UPnP module to invoke a "SET" action on the AppURI state variable on the selected HbbTV companion device. On the HbbTV companion device, the received URI is launched in a WebView, and displayed to the user.)

The device table may store the URI according to each companion device detected by the TV via the AIT or the address of the server (e.g., the broadcaster server). The device table may store device information obtained while the TV is connected to the companion device. In addition, the device table may store the URI per companion device detected via the server. Accordingly, the device table is a storage space for managing information necessary to operate the companion device collected at HbbTV (browser level) and UPnP (physical level).

The device information may contain information on a device type of a companion device. The TV is a CP of UPnP. In one embodiment, an HbbTV 2.0 receiver shall implement a logical UPnP device with a UPnP device type of urn: hbbtv-org:device:hbbtv2.0rcvr. An HbbTV 2.0 companion device shall implement a logical UPnP device with a UPnP device type of urn:hbbtv-org:device:hbbtv2.0rcvr. In order to form the Namespace Identifier (NID) prefix in the above URN, the DNS name of hbbtv.org has been converted to hbbtv-org as required by RFC 2141. The remaining part after hbbtv-org is therefore the Namespace Specific String (NSS). (An HbbTV 2.0 Receiver shall implement a logical UPnP device with a UPnP device type of urn:hbbtv-org:device: hbbtv2.0rcvr. An HbbTV 2.0 companion device shall implement a logical UPnP device with a UPnP device type of urn:hbbtv-org:device:hbbtv2.0rcvr. To form the Namespace Identifier (NID) prefix in the above URN, the DNS name of hbbtv.org has been converted to hbbtv-org as required by RFC 2141. The remaining part after hbbtv-org is therefore the Namespace Specific String (NSS).)

The HbbTV 2.0 receiver supports a Devinfo service and an AppURI service having a service type and a service ID as follows.

TABLE 1

| Service | Service Type | Service ID |
| --- | --- | --- |
| DevClass | hbbtv2.0devClass:1 | urn:hbbtv-org:serviceid:hbbtv2.0devClass1 |
| AppURI | hbbtv2.0appURI:1 | urn:hbbtv-org:serviceid:hbbtv2.0appURI1 |
| DisplayIntent | hbbtv2.0displayIntent1 | urn:hbbtv-org:serviceid:hbbtv2.0displayIntent1 |

Using the Devinfo service, the TV gets the device information from the Companion Device. The TV receives the companion device information via the "GET" control of UPnP. The protocol for the Devinfo service shall use the parameters defined below. (Using the Devinfo Service, the TV gets the device information from the Companion Device. The TV receives the companion device information via the "GET" control of UPnP. The protocol for the Devinfo service shall use the parameters defined below.)

TABLE 2

| Variable name | Req(uired) or Opt(ional) | Data | Evented? |
| --- | --- | --- | --- |
| DevClass | Req | String | No |

Table 2 shows a Devinfo Service state variable.

TABLE 3

| Name | Req/Opt |
| --- | --- |
| GetDevClass | Req |

Table 3 shows a DevClass Service action.

TABLE 4

| Argument | Direction | Related state variable |
| --- | --- | --- |
| DevClass | OUT | DevClass |

Table 4 shows GetDevClass action arguments.

For using the DevClass state variable, the following rules shall apply.

a) The companion devices shall identify themselves as being of the "Phone", "Tablet" or "PC" class.

b) The TV devices shall identify themselves as being of the "TV" class.

(For using the DeVClass state variable, the following rules shall apply:

a) Companion devices shall identify themselves as being of the "Phone", "Tablet" or "PC" class.

b) TV devices shall identify themselves as being of the "TV" class.)

The AppURI service may be used to send the launching URI for the application from the TV to the companion device. When a plurality of companion devices is available, the HbbTV application will prompt the user to select one thereof, and the URI for the selected device is sent via the "SET" control of UPnP. The protocol for the AppURI service shall use the parameters defined below. (The AppURI service may be used for sending the launching URI for the application from the TV to the companion device. When several companion devices are available, the HbbTV application will prompt the user to select one thereof, and the URI for that device is sent thereto via the "SET" control of UPnP. The protocol for the AppURI service shall use the parameters defined below.)

TABLE 5

| Variable name | Req(uired) or Opt(ional) | Data | Evented? |
| --- | --- | --- | --- |
| AppURI | Req | String | No |
| DisplayIntent | Req | String | No |

Table 5 shows an AppURI Service state variable.

TABLE 6

| Name | Req(uired) or Opt(ional) |
| --- | --- |
| SetAppURI | Req |

Table 6 shows an AppURI Service action.

TABLE 7

| Argument | Direction | Related state variable |
|---|---|---|
| AppURI | IN | AppURI |
| DisplayIntent | IN | DisplayIntent |

Table 7 shows SetAppURI action arguments.

For using the DisplayIntent state variable and action argument, the following rules shall apply.

a) It shall be set to either "WebView" or "System-Browser".

b) If "WebView" is transmitted, the associated URI may be launched in a WebView embedded in the companion application; in all other cases, the URI shall be launched in the default Web browser of the companion device.

c) The companion devices that do not provide an embedded WebView shall launch all URIs in the default Web browser.

(For using the DisplayIntent state variable and action argument, the following rules shall apply:

a) It shall be set to either "WebView" or "System-Browser".

b) if it is set to "WebView", the associated URI may be launched in a WebView embedded in the companion application; in all other cases, the URI shall be launched in the default Web browser of the companion device.

c) companion devices that do not provide an embedded WebView, shall launch all URIs in the default Web browser.)

Figure 9:
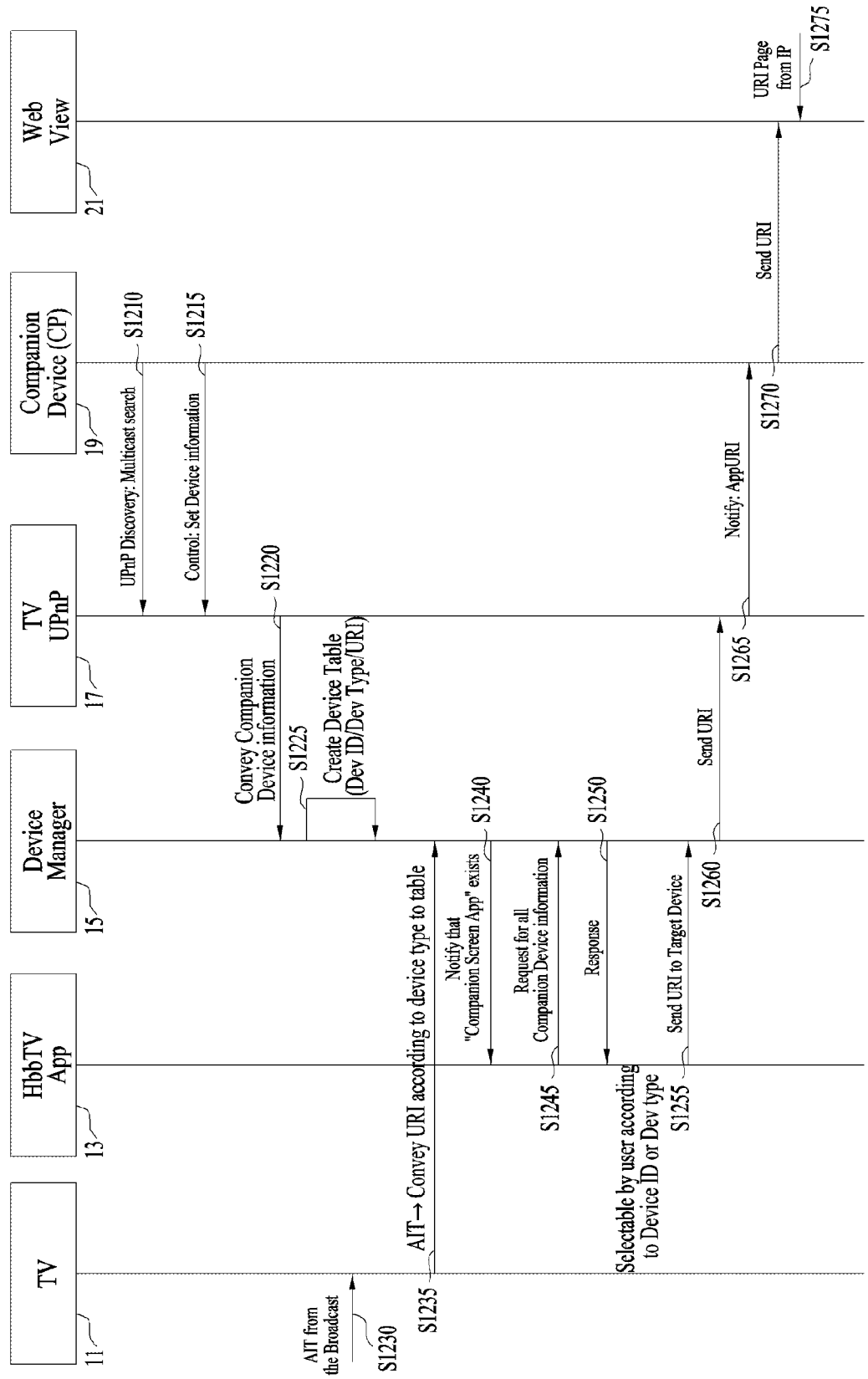
FIG. 9 is a timing chart illustrating a method of executing an additional service in a companion device according to a second embodiment of the present invention.

FIG. 9 is a timing chart illustrating a method of executing an additional service in a companion device according to a second embodiment of the present invention.

FIG. 9 shows an embodiment in which application URIs of all companion device are included in the AIT and a CP is located in the companion device.

Referring to FIG. 9, the companion device 19, which is the CP, performs discovery operation using a multicast method to the TV (S1210). When the discovery operation is completed, a control signal "Set" for setting device information of the companion device is transmitted from the companion device 19 to the TV (S1215). The UPnP unit 17 of the TV conveys the companion device information to the device manager 15 (S1220). The device manager 15 creates a device table and mages a device ID, a device type and a URI (S1225).

The TV 11 receives the AIT (S1230). The AIT may include an application URI to be launched in the companion device. The TV 11 parses the received AIT and sends the application URI according to the device type to the device manager 15 (S1235). The device manager 15 updates the URI corresponding to the companion device of the device table. The device manager 15 notifies the HbbTV application 13 that the companion screen application exists (S1240). The HbbTV application requests all companion device information (S1245). The device manager 15 conveys the companion device information in response to the request (S1250).

The TV notifies the user that an additional service exists when the additional service related to a broadcast program exists and the user may select the additional service and the type of the companion device which will execute the additional service.

The HbbTV application 13 conveys information related to the selected companion device to the device manager 15 (S1255). The device manager 15 sends the application URI corresponding to the selected companion device to the UPnP unit 17 of the TV (S1260). When the URI is sent, the UPnP unit 17 of the TV notifies the companion device of the sent URI (S1265). The companion device 19 sends the transmitted URI to the web view unit 21 (S1270). The web view unit 21 displays a URI page using the Internet protocol network (S1275).

In other words, the multicast search is sent to the TV via the UPnP unit of the companion device, which is the CP, to begin the discovery operation. When discovery of the TV is completed, the companion device sends a control signal "Set" for setting the device type of the companion device to the TV. The TV conveys the device information set in the companion device to the device manager. The device table manages the device IDs and device types of all companion devices.

The AIT includes the application URI to be launched in the companion device and the TV receives the AIT. The received AIT is parsed and conveyed to the device manager to update the URI corresponding to the companion device in the device table. The device table includes the application URI corresponding to the companion device. If the device type is not set in the AIT (e.g., generic URI), the common URI is conveyed to the companion device. When the companion device application exists, via the TV, the user is notified that the companion device application is available via the AIT. The user identifies this information and selects a companion device to connect to. The selected device is ready to convey the URI to the device manager and the companion device.

The device manager sends the application URI corresponding to the companion device selected by the user to the UPnP unit of the TV. When the URI is sent, the companion device (CP) selected by the user is notified of the URI changed (sent) in the TV and receives the application URI. On the companion device, the received URI is displayed to the user via the web view unit.

The device information may include information on device type of the companion device. The companion device is a control point (CP) of UPnP. As one embodiment, the UPnP device type of the HbbTV 2.0 receiver is urn:hbbtv.org:device:hbbtv2.0rcvr. In some cases, in order to form a Namespace Identifier (NID) prefix, the DNS name of hbbtv.org may be converted into hbbtv-org as required in RFC2141. The HbbTV 2.0 receiver supports a Devinfo service and an AppURI serving having a service type and a service ID as follows.

TABLE 8

| Service | Service type | Service ID |
|---|---|---|
| DevInfo | hbbtv2.0devinfo:1 | urn:hbbtv.-org:serviceid:hbbtv2.0devinfo1 |
| AppURI | hbbtv2.0appURI:1 | urn:hbbtv.org:service:hbbtv2.0appURI1 |

Table 8 shows a service type and a service ID.

Using the Devinfo service, the TV may receive the device information from the companion device which is the CP. Since the companion device is the CP, information is conveyed to the TV via Set control according to the property of UPnP.

The AppURI service is a service for delivering the URI for launching the application from the TV to the companion device (CP). The URI corresponding to the companion device selected by the user is obtained via the HbbTV application and is conveyed to the companion device via UPnP.

TABLE 9

| Variable name | Req(uired) or Opt(ional) | Data | Evented? |
| --- | --- | --- | --- |
| dev_info | Req | String | No |

Table 9 shows a Devinfo Service state variable.

TABLE 10

| Name | Req(uired) or Opt(ional) |
| --- | --- |
| SetDevInfo | Req |

Table 10 shows a Devinfo Service action.

TABLE 11

| Argument | Direction | Related state variable |
| --- | --- | --- |
| dev_info | IN | dev_info |

Table 11 shows Argument of GetDevInfo action.

TABLE 12

| Variable name | Req(uired) or Opt(ional) | Data | Evented? |
| --- | --- | --- | --- |
| AppURI | Req | String | Yes |

Table 12 shows an AppURI Service state variable.

TABLE 13

| Name | Req(uired) or Opt(ional) |
| --- | --- |
| NotifyAppURI | Req |

Table 13 shows AppURI Service actions.

TABLE 14

| Argument | Direction | Related state variable |
| --- | --- | --- |
| AppURI | IN | AppURI |

Table 14 shows Argument of SetAppURI action.

Figure 10:
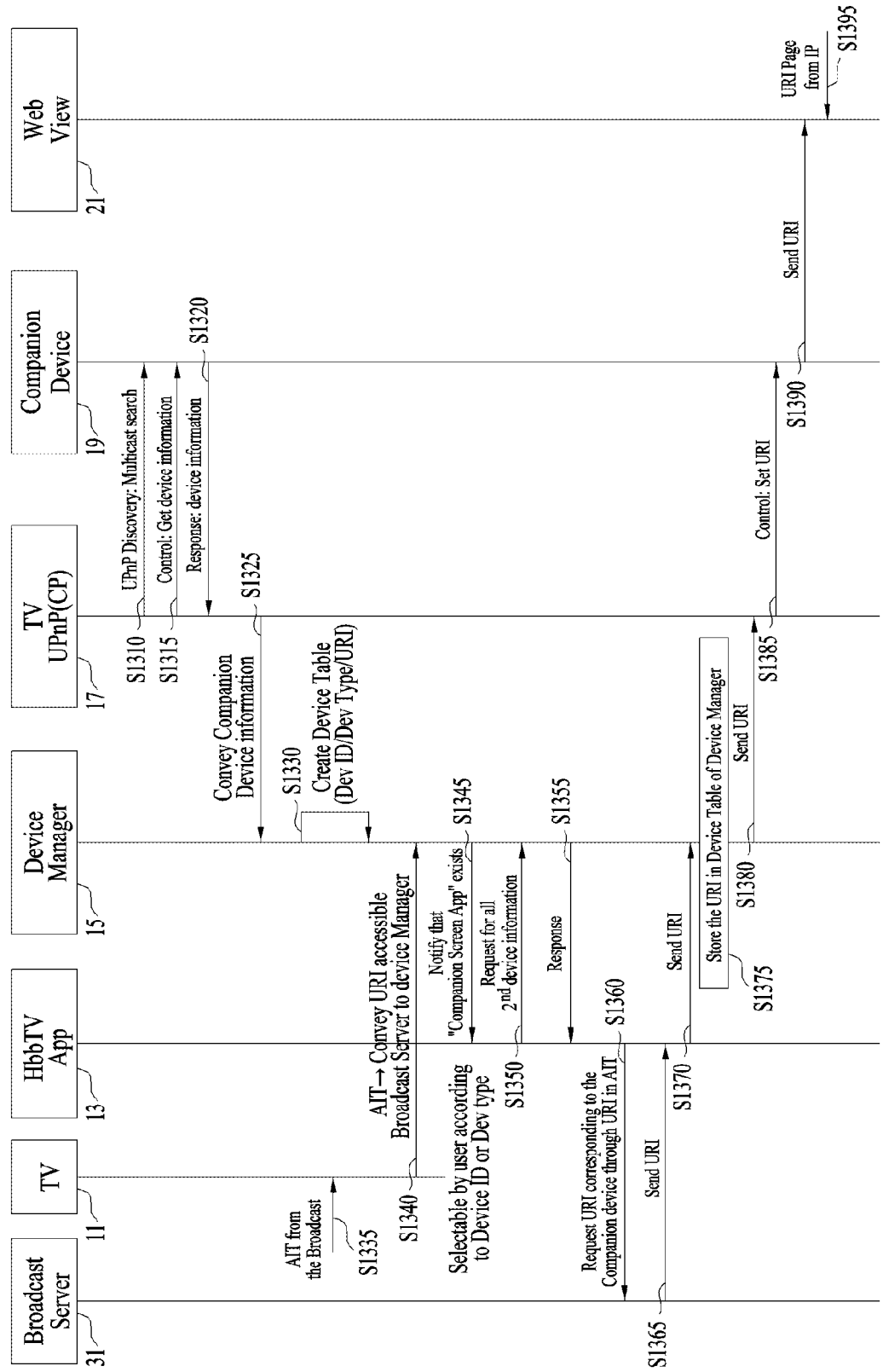
FIG. 10 is a timing chart illustrating a method of executing an additional service in a companion device according to a third embodiment of the present invention.

FIG. 10 is a timing chart illustrating a method of executing an additional service in a companion device according to a third embodiment of the present invention.

FIG. 10 shows the flow of events when a deferred URI is conveyed in the AIT. Accordingly, the application URI needs to be retrieved from a remote server before the application URI is transferred to the companion device. (FIG. 10 depicts the flow of events when a deferred URI is conveyed in the broadcast AIT. This means that the URI needs to be retrieved from a remote server before it can be transferred to the companion device.)

The TV, which is the CP, sends a multicast search to the companion device 19 via the UPnP unit 17 to begin discovery operation (S1310). When the discovery operation of the companion device 19 is completed, the UPnP unit 17 transmits a control signal "Get" for obtaining device type information to the companion device 19 (S1315). The companion device 19 transmits the device information to the UPnP unit 17 of the TV in response to the control signal (S1320). The transmitted device information is conveyed to the device manager 15 (S1325). The device manager 15 creates the device table and manages a device ID, a device type and a URI (S1330).

The TV 11 receives the AIT (S1335). The AIT may include a deferred URI capable of accessing the server. The TV 11 parses the received AIT and sends the deferred URI capable of accessing the server to the device manager 15 (S1340). The device manager 15 notifies the HbbTV application 13 that the companion screen application exists (S1345). The HbbTV application 13 requests all companion device information (S1350). The device manager 15 conveys the companion device information in response to the request (S1355). The HbbTV application 13 requests the application URI corresponding to the device type of the companion device via the deferred URI (S1360). The server 31 transmits the application URI per device type to the TV in response to the request (S1365). The HbbTV application 13 sends the received application URI to the device manager 15 (S1370). The device manager 15 stores the sent application URI in the device table (S1375).

The TV 11 notifies the user that an additional service exists when the additional service related to a broadcast program exists and the user may select the additional service and the type of the companion device which will execute the additional service.

The device manager 15 sends the application URI corresponding to the selected companion device to the UPnP unit 17 of the TV (S1380). The UPnP unit 17 of the TV transmits a control signal "Set URI" to the selected companion device 19 (S1385). The companion device 19 delivers the transmitted URI to the web view unit 21 (S1390). The web view unit 21 displays a URI page using the Internet protocol network (S1395).

The TV, which is the CP, begins discovery operation by broadcasting a multicast search to HbbTV companion devices via the UPnP unit. When discovery of the companion devices is completed, the TV sends a control signal "Get" for obtaining the device type to the companion device. The companion device conveys the device information in response to the control signal. The delivered device information is conveyed to the device table of the device manager to manage the device ID and the device type. (The UPnP Control Point in the TV begins discovery by broadcasting a multicast search for available HbbTV companion devices. When discovery is completed, the Device Manager in the TV receives a list of available HbbTV companion devices, and sends a "GET" control to each HbbTV companion device to learn its name and device class. This information is stored in the Device Table by the Device Manager.)

The AIT contains a deferred URI capable of accessing the server and the TV receives the AIT. The received AIT is parsed and delivered to the device manager. The device manager updates the URI for all companion devices. Since the deferred URI is not identified according to device class, a URI capable of being identified according to the device class is necessary. The device manager notifies the HbbTV application via a DOM event that the deferred URI is available. At this time, the HbbTV application resolves the deferred URI and stores a final URI in the device table. Thereafter, the HbbTV application notifies the device manager that the URI has been updated and the device manager generates a second DOM event. When the companion device application exists, via the TV, the user is notified that the companion device application is available via the AIT. The user identifies this information and selects a companion device to connect to. The selected device is ready to convey the URI to the device manager and the companion device.

(The AIT contains one launching URI for a companion application, and labels it as a deferred URI. The TV first receives the AIT from the broadcast, then searches the AIT for companion URI descriptors, and (if any are found) sends these URIs to the Device Manager to update the URIs for all devices of the given device classes. Since the information in the AIT for a deferred URI does not specify to which device classes it is applicable, this information will only be available after the deferred URI has been resolved. Hence, the Device Manager stores the deferred URI in the AppURI column for all available companion devices, and marks them as deferred by setting the IsDeferredURI flag for each thereof. Then, the Device Manager notifies the HbbTV application on the TV via a DOM event that deferred URIs are available. The HbbTV application on the TV then resolves the deferred URIs, and stores the final URIs in the device table. After this is finished, the HbbTV application notifies the Device Manager that the URIs have been updated, and the Device Manager generates a second DOM event, this time with the final URIs. As in the previous use case, the HbbTV application chooses (possibly with help from the user) a device to launch the companion application. The TV is now ready to send the launching URI to the selected HbbTV companion device.)

The device manager sends the application URI corresponding to the companion device selected by the user to the UPnP unit of the TV. The sent URI is sent to the companion device selected by the user via a control signal "Set URI" from the TV (CP) to the companion device. On the companion device, the received URI is displayed to the user via the web view unit. (When the Device Manager is instructed by the HbbTV application on the TV to send the launching URI to the selected companion device, it will use the UPnP module to invoke a "SET" action on the AppURI state variable on the selected HbbTV companion device. On the HbbTV companion device, the received URI is launched in a WebView, and displayed to the user.)

Figure 11:
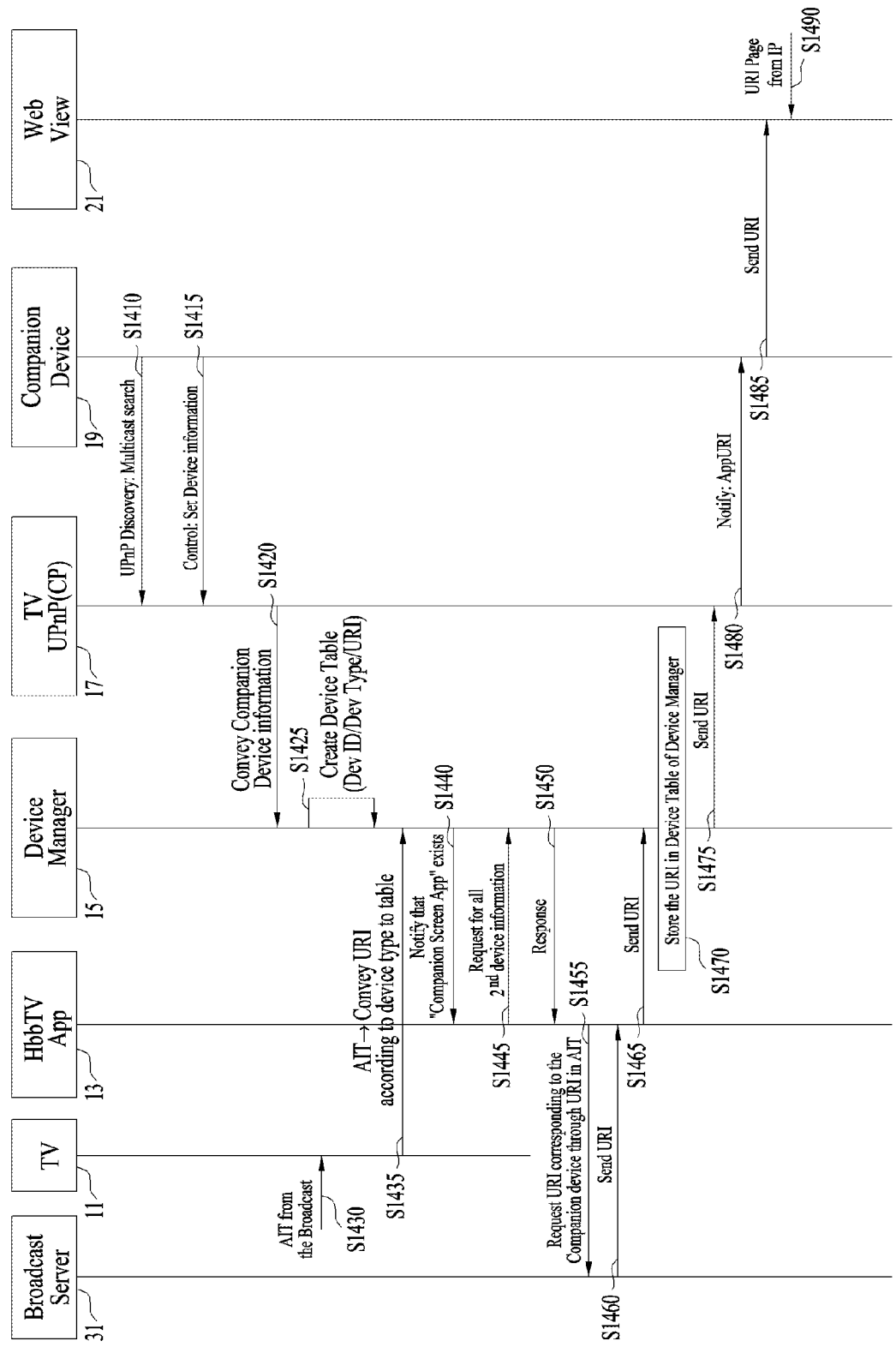
FIG. 11 is a timing chart illustrating a method of executing an additional service in a companion device according to a fourth embodiment of the present invention.

FIG. 11 is a timing chart illustrating a method of executing an additional service in a companion device according to a fourth embodiment of the present invention.

Referring to FIG. 11, the companion device 19, which is the CP, performs discovery operation using a multicast method to the TV (S1410). When the discovery operation is completed, a control signal "Set" for setting device information of the companion device is transmitted from the companion device 19 to the TV (S1415). The UPnP unit 17 of the TV conveys the companion device information to the device manager 15 (S1420). The device manager 15 creates a device table and manages a device ID, a device type and a URI (S1425).

The TV 11 receives the AIT (S1430). The AIT may include a deferred URI capable of accessing the server. The TV 11 parses the received AIT and sends the deferred URI capable of accessing the server to the device manager 15 (S1435). The device manager 15 notifies the HbbTV application 13 that the companion screen application exists (S1440). The HbbTV application 13 requests all companion device information (S1445). The device manager 15 conveys the companion device information in response to the request (S1450). The HbbTV application 13 requests the application URI corresponding to the device type of the companion device via the deferred URI (S1455). The server 31 transmits the application URI per device type to the TV in response to the request (S1460). The HbbTV application 13 sends the received application URI to the device manager 15 (S1465). The device manager 15 stores the sent application URI in the device table (S1470).

The TV 11 notifies the user that an additional service exists when the additional service related to a broadcast program exists and the user may select the additional service and the type of the companion device which will execute the additional service.

The device manager 15 sends the application URI corresponding to the selected companion device to the UPnP unit 17 of the TV (S1475). When the URI is sent, the UPnP unit 17 of the TV notifies the companion device of the sent URI (S1480). The companion device 19 sends the transmitted URI to the web view unit 21 (S1485). The web view unit 21 displays a URI page using the Internet protocol network (S1490).

In other words, the multicast search is sent to the TV via the UPnP of the companion device, which is the CP, to begin the discovery operation. When discovery of the TV is completed, the companion device sends a control signal "Set" for setting the device type of the companion device to the TV. The TV conveys the device information set in the companion device to the device manager. The device table manages the device IDs and device types of all companion devices.

The AIT contains a deferred URI capable of accessing the server and the TV receives the AIT. The received AIT is parsed and delivered to the device manager. The device manager updates the URI for all companion devices. Since the deferred URI is not identified according to device class, a URI capable of being identified according to the device class is necessary. The device manager notifies the HbbTV application via a DOM event that the deferred URI is available. At this time, the HbbTV application resolves the deferred URI and stores a final URI in the device table. Thereafter, the HbbTV application notifies the device manager that the URI has been updated and the device manager generates a second DOM event. When the companion device application exists, via the TV, the user is notified that the companion device application is available via the AIT. The user identifies this information and selects a companion device to connect to. The selected device is ready to convey the URI to the device manager and the companion device.

The device manager sends the application URI corresponding to the companion device selected by the user to the UPnP unit of the TV. When the URI is sent, the companion device (CP) selected by the user is notified of the URI changed (sent) in the TV and receives the application URI. On the companion device, the received URI is displayed to the user via the web view unit.

Figure 12:
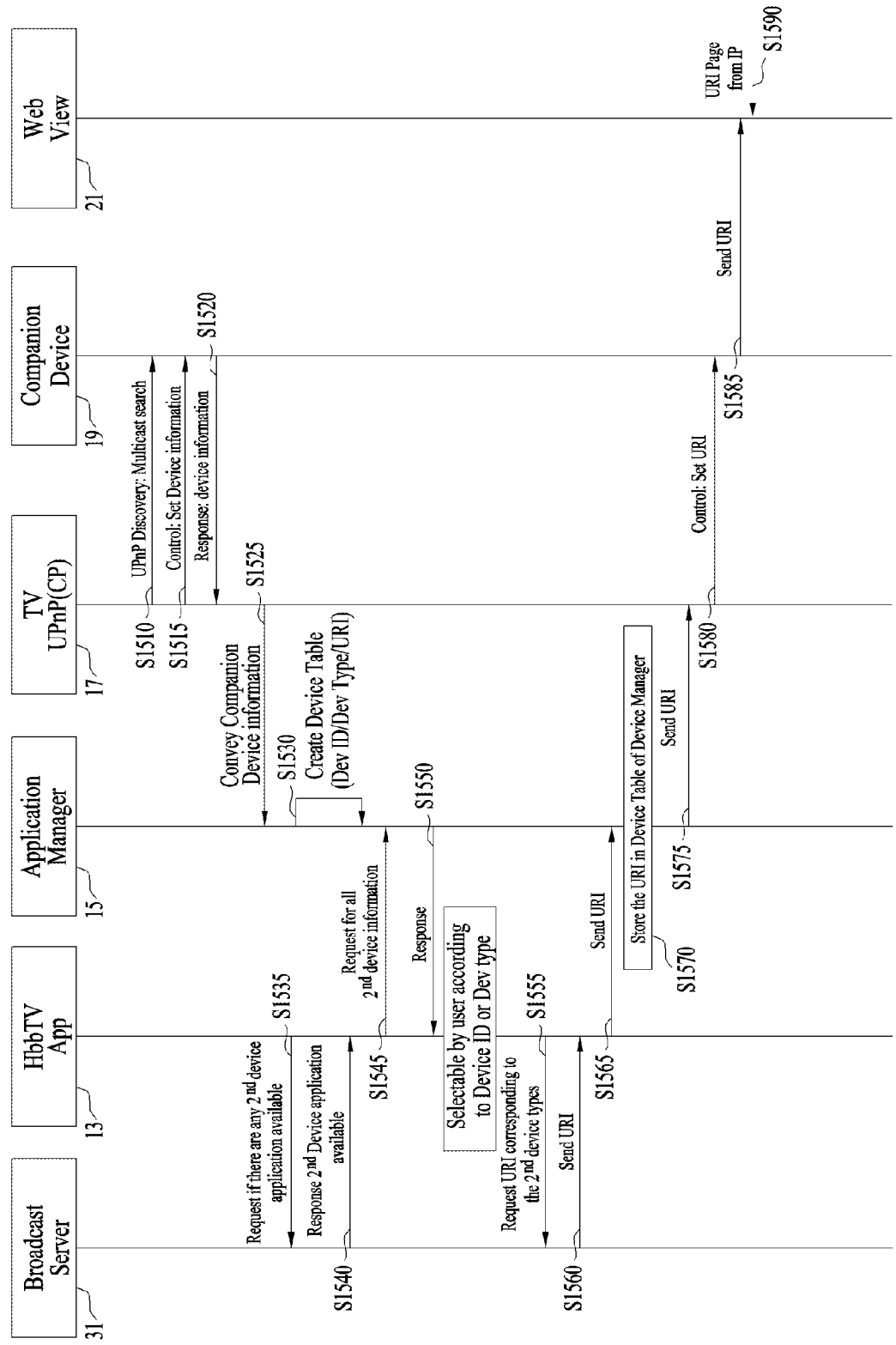
FIG. 12 is a timing chart illustrating a method of executing an additional service in a companion device according to a fifth embodiment of the present invention.

FIG. 12 is a timing chart illustrating a method of executing an additional service in a companion device according to a fifth embodiment of the present invention.

FIG. 12 shows the flow of events when the trigger for launching a companion application is received from a broadcast server, instead of the AIT. This method may allow launching of companion applications without receiving any broadcast signal. The HbbTV application of the TV needs to actively query the broadcast server. Automatic triggering for the AIT is not supported. (FIG. 12 depicts the flow of events when the trigger for launching a companion application comes from a broadcast server, instead of the broadcast AIT. This allows launching of companion applications without any broadcast reception. To enable this use case, the HbbTV application on the TV needs to actively query the broadcast server. An automatic triggering like for the broadcast AIT is not supported.)

The TV, which is the CP, sends a multicast search to the companion device 19 via the UPnP unit 17 to begin discovery operation (S1510). When the discovery operation of the companion device 19 is completed, the UPnP unit 17 transmits a control signal "Get" for obtaining device type information to the companion device 19 (S1515). The companion device 19 transmits the device information to the UPnP unit 17 of the TV in response to the control signal (S1520). The transmitted device information is conveyed to the device manager 15 (S1525). The device manager 15 creates the device table and manages a device ID, a device type and a URI (S1530).

The HbbTV application 13 of the TV requests to determine if there is an available companion device application from the broadcast server 31 (S1535). When there is an available companion device application, the broadcast server 31 sends a response to the HbbTV application 13 (S1540). The HbbTV application 13 requests all companion device information (S1545). The device manager 15 conveys companion device information in response to the request (S1550).

The TV 11 notifies the user that an additional service exists when an additional server related to a broadcast program exists and the user may select an instance or device type. The HbbTV application 13 requests the URL corresponding to the companion device type from the broadcast server 31 (S1555). The broadcast server 31 transmits the requested URI to the HbbTV application (S1560).

The HbbTV application 13 sends the received application URI to the device manager 15 (S1565). The device manager 15 stores the sent application URI in the device table (S1570). The device manager 15 sends the application URI corresponding to the selected companion device to the UPnP unit 17 of the TV (S1575). The UPnP unit 17 of the TV transmits a control signal "Set URI" to the selected companion device 19 (S1580). The companion device 19 conveys the control signal to the selected companion device 19 (S1580). The companion device 19 sends the transmitted URI to the web view unit 21 (S1585). The web view unit 21 displays a URI page using the Internet protocol network (S1590).

In other words, the TV, which is the CP, begins discovery operation by broadcasting a multicast search to HbbTV companion devices via the UPnP unit. When discovery of the companion devices is completed, the TV sends a control signal "Get" for obtaining a device type to the companion devices. Each companion device conveys device information in response to the control signal. The conveyed device information is conveyed to the device table of the device manager to manage a device ID and a device type. (The UPnP Control Point in the TV begins discovery by broadcasting a multicast search for available HbbTV companion devices. When discovery is completed, the Device Manager in the TV receives a list of available HbbTV companion devices, and sends a "GET" control to each HbbTV companion device to learn its name and device class. This information is stored in the Device Table by the Device Manager.)

Instead of waiting for the device manager to detect companion application URIs in the AIT, the HbbTV application queries the broadcast server to determine whether companion device applications are available for any of the currently available companion devices. If there is a companion device application, the TV is provided a launching URI. Then, the user may select a connected device for sending the URI of the application. The companion devices which are registered in the device table of the device manager may update the application URI corresponding to the device type received from the broadcast server. The TV is ready to send the launching URI to the selected companion device. (Instead of waiting for the Device manager to detect companion application URIs in the broadcast AIT, the HbbTV application queries the broadcast server whether companion device applications are available for any of the currently available companion devices. If there is a companion device application, the TV is provided the launching URI. Then, the user selects to which connected device to send the URI of the application. The companion devices that are registered in Device Table of Device Manager update the URI of the application corresponding to the device type from the broadcast server. The TV is now ready for sending the launching URI to the selected HbbTV companion device.)

The device manager sends the application URI corresponding to the companion device selected by the user to the UPnP unit of the TV. The URI sent from the TV (CP) to the companion device selected by the user via control "Set URI". On the companion device, the received URI is displayed to the user via the web view unit. (When the Device Manager is instructed by the HbbTV application on the TV to send the launching URI to the selected companion device, it will use the UPnP module to invoke a "SET" action on the AppURI state variable on the selected HbbTV companion device. On the HbbTV companion device, the received URI is launched in a WebView, and displayed to the user.)

Although the TV may receive a broadcast signal from a broadcast station via a tuner, the TV may be connected only via an IP. When the TV is connected only via an IP, the TV may indicate presence of the companion device application without the tuner via communication between the HbbTV application and the broadcast server.

Figure 13:
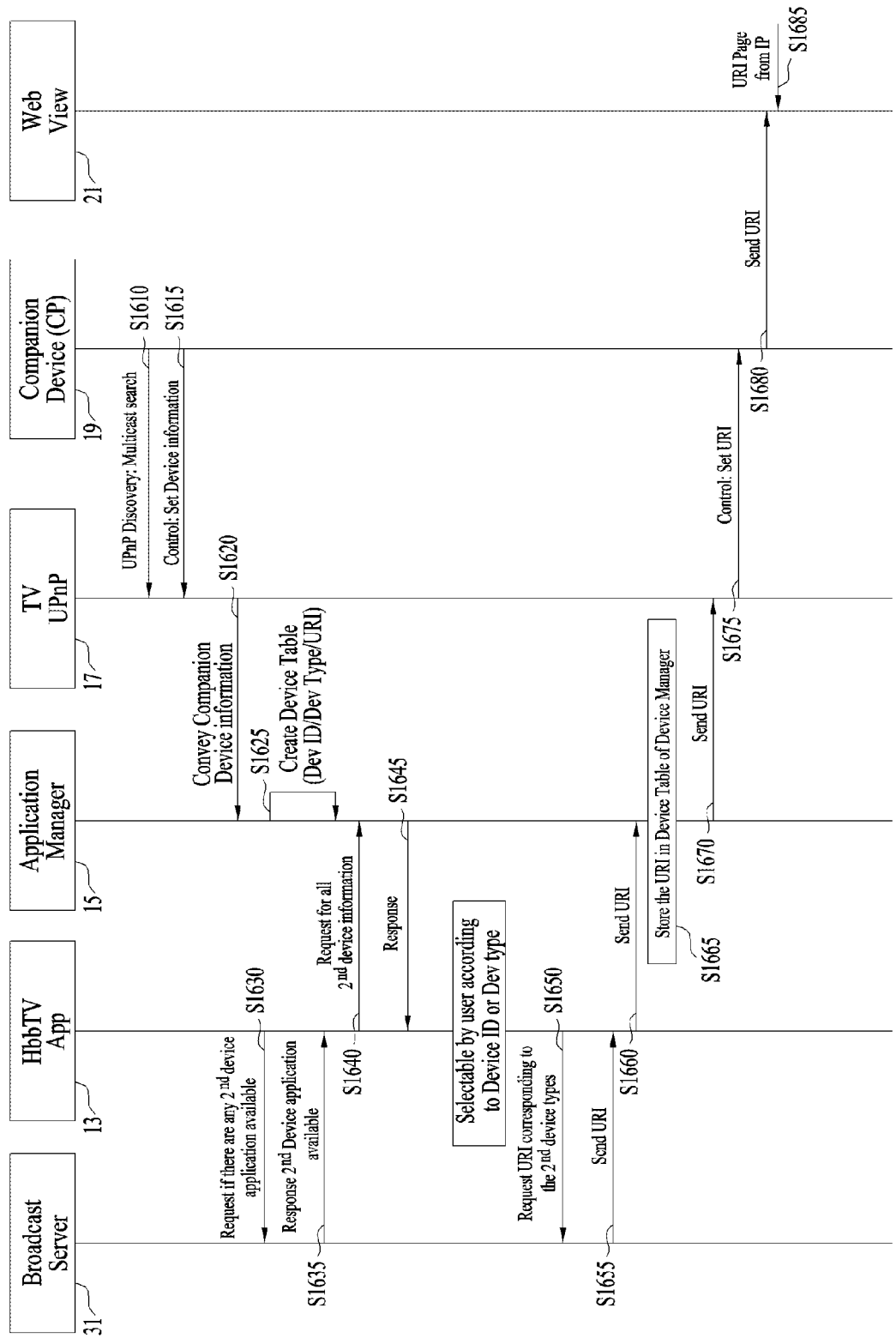
FIG. 13 is a timing chart illustrating a method of executing an additional service in a companion device according to a sixth embodiment of the present invention.

FIG. 13 is a timing chart illustrating a method of executing an additional service in a companion device according to a sixth embodiment of the present invention.

Referring to FIG. 13, the companion device 19, which is the CP, performs discovery operation using a multicast method to the TV (S1610). When discovery operation is completed, a control signal "Set" for setting device information of the companion device is transmitted from the companion device 19 to the TV (S1615). The UPnP unit 17 of the TV conveys the companion device information to the device manager 15 (S1620). The device manager 15 creates a device table and manages a device ID, a device type and a URI (S1625).

The HbbTV application 13 of the TV requests to determine if there is an available companion device application from the broadcast server 31 (S1630). When there is an available companion device application, the broadcast server 31 sends a response to the HbbTV application 13 (S1635). The HbbTV application 13 requests all companion device information (S1640). The device manager 15 conveys companion device information in response to the request (S1645).

The TV 11 notifies the user that an additional service exists when an additional server related to a broadcast program exists and the user may select an instance or device type. The HbbTV application 13 requests the URL corresponding to the companion device type from the broadcast server 31 (S1650). The broadcast server 31 transmits the requested URI to the HbbTV application (S1655).

The HbbTV application 13 sends the received application URI to the device manager 15 (S1660). The device manager 15 stores the conveyed application URI in the device table (S1665). The device manager 15 sends the application URI corresponding to the selected companion device to the UPnP unit 17 of the TV (S1670). If the URI is sent, the UPnP unit 17 of the TV transmits the sent URI to the companion device (S1675). The companion device 19 sends the transmitted URI to the web view unit 21 (S1680). The web view unit 21 displays a URI page using the Internet protocol network (S1685).

In other words, the TV, which is the CP, begins discovery operation by broadcasting a multicast search to the TV via the UPnP unit. When discovery of the TV is completed, the companion device sends a control signal "Set" for setting a device type of the companion device to the TV. The TV conveys the device information set in the companion device to the device manager. The device table manages the device IDs and device types of all companion devices.

Instead of waiting for the device manager to detect companion application URIs in the AIT, the HbbTV application queries the broadcast server to determine whether companion device applications are available for any of the currently available companion devices. If there is a companion device application, the TV is provided a launching URI. Then, the user may select a connected device for sending the URI of the application. The companion devices which are registered in the device table of the device manager may update the application URI corresponding to the device type received from the broadcast server. The TV is ready to send the launching URI to the selected companion device.

The device manager sends the application URI corresponding to the companion device selected by the user to the UPnP unit of the TV. If the URI is sent, the companion device CP selected by the user is notified of the URI changed (sent) in the TV and receives the application URI. On the companion device, the received URI is displayed to the user via the web view unit.

FIG. 14 is a diagram illustrating a URI descriptor according to one embodiment of the present invention.

FIGS. 8 to 11 illustrate the embodiments of receiving the URI via the AIT. FIG. 14 illustrates a descriptor for sending a URI when the AIT contains one URI. For example, one URI may be a generic URI, a deferred URI, etc. Detailed information included in a single URI descriptor will now be described.

A descriptor_tag field is an 8-bit identifier for identifying the descriptor and has a value of 0x6F in a single URI descriptor. (The 8-bit integer with value 0x6F identifies this descriptor.)

A descriptor_length field is an 8-bit field that indicates the number of bytes following the descriptor length field. (The 8-bit field indicates the number of bytes following the descriptor length field.)

A URI_length field is a 16-bit field that indicates the number of bytes following the URI field. (The 16-bit field indicates the number of bytes following the URI length field.)

A URI_char field indicates the characteristics of the URI. (The 8-bit integer identifies the characters of URI.)

FIG. 15 is a diagram illustrating a URI descriptor according to another embodiment of the present invention.

FIG. 15 illustrates a descriptor for sending a URI when the AIT contains a plurality of URIs. For example, the plurality of URIs may become specific URIs, etc. Detailed information contained in a multi URI descriptor will now be described.

A descriptor_tag field is an 8-bit identifier for identifying the descriptor and has a value 0x6F in a single URI descriptor. (The 8-bit integer with value 0x6F identifies this descriptor.)

A descriptor_length field is an 8-bit field that indicates the number of bytes following the descriptor length field. (The 8-bit field indicates the number of bytes following the descriptor length field.)

A device_number field is a 16-bit field that indicates the number of possible companion devices in the descriptor. (The 16-bit field indicates the number of possible Companion Screen Device in the descriptor.)

A device_type field indicates the type of the companion device. (The 8 bit field defines the type of the Companion Screen Device.) The device_type will be described in detail with reference to FIG. 16.

A URI_length field is a 16-bit field that indicates the number of bytes following the URI length field. (The 16-bit field indicates the number of bytes following the URI length field.)

A URI_char field indicates the characteristics of the URI. (The 8-bit integer identifies the characters of URI.)

FIG. 16 is a diagram showing an embodiment of signaling device type information.

Detailed information of a device_type will now be described.

If the device_type is 0, the companion device indicates a PC class.

If the device_type is 1, the companion device indicates a tablet class.

If the device_type is 2, the companion device indicates a smartphone class.

FIG. 17 is a diagram illustrating an embodiment of signaling companion device information.

The AIT may include a URI linkage descriptor in order to signal availability of the companion device.

A URI linkage type field of the URI linkage descriptor may be set to 0x80 in order to indicate that a companion application URI is transmitted. In order to indicate the type of a reception device indicated by the URI, a private data field may encode the companion link info structure shown in FIG. 17.

A link_target_type field is an 8-bit field indicating the purpose of the URI (This 8-bit field indicates the purpose of the URI.) Detailed information thereof will be described with reference to FIG. 18.

A display_intent field indicates a method of displaying an application launched via the URI. (This 8-bit field indicates the intended way of displaying the application launched via the URI.) Detailed information thereof will be described with reference to FIG. 19.

A reserved field is a 6-bit field which is reserved for future use and shall be set to 0. (This 6-bit field is reserved for future use and shall be set to zero.)

For transmission of the URI linkage descriptor contained in the AIT, the following rules shall apply. Transmission of the URI linkage descriptor with a URI linkage type field value of 0x80 is optional. Such a descriptor is allowed more than once in each instance of a descriptor loop. There shall not be multiple instances of such a descriptor with the same link_target_type in a given instance of a descriptor loop. (For transmission of the uri_linkage_descriptor in the broadcast AIT, the following rules shall apply: Transmission of a uri_linkage_descriptor with a uri_linkage_type value of 0x80 is optional. Such a descriptor is allowed more than once in each instance of a descriptor loop. There shall not be multiple instances of such a descriptor with the same link_target_type in a given instance of a descriptor loop.)

FIG. 18 is a diagram illustrating an embodiment of signaling URI type information.

Detailed information of the link_target_type will now be described.

When the link_target_type value is 0x01, the URI contained in the AIT indicates a deferred URI.

When the link_target_type value is 0x02, the URI contained in the AIT indicates a generic URI for all device classes.

When the link_target_type value is 0x03, the URI contained in the AIT indicates a specific URI for a table device class.

When the link_target_type value is 0x04, the URI contained in the AIT indicates a specific URI for a TV device class.

When the link_target_type value is 0x05, the URI contained in the AIT indicates a specific URI for a PC device class.

FIG. 19 is a diagram illustrating an embodiment of signaling information on a method of executing a companion application.

Detailed information of a display_intent will now be described.

When the display_intent value is 0, the companion application is displayed on a system web browser.

When the display_intent value is 1, the companion application is displayed on an embedded web view.

FIG. 20 is a diagram illustrating GET request header information of a deferred URI according to one embodiment of the present invention.

When the deferred URI is transmitted in a companion_link_info structure, a signal transmission apparatus is not provided with a direct link to a companion application. Instead, a URI conveyed in a URI_linkage_descriptior may identify the resource on a remote server from which information about companion device applications can be downloaded. In this case, the TV shall resolve the URI into a location and obtains a resource from that location. The resolution of the deferred URI shall be implemented using the device manager APIs. Only URIs conforming to "http" or "https" URI schemes shall be used as a deferred URI in the URI_linkage_descriptor. (When a deferred URI is conveyed in the companion_link_info structure (indicated by a link_target_type of 0x00), the terminal is not provided with a direct link to the companion application. Instead, the URI conveyed in the uri_linkage_descriptor identifies a resource on a remote server from which information about companion device applications can be downloaded. In this case, the terminal shall resolve the URI into a location (if needed), and obtain the resource from that location. Resolution of deferred URIs shall be implemented using the Device Manager APIs. Only URIs conforming to the "http" or "https" URI schemes shall be used as deferred URIs in the uri_linkage_descriptor.)

The TV issues an HTTP GET request carrying header fields. Clients may encode additional header fields, and servers may ignore those additional header fields. The server will respond to the request. When one of the redirect status codes is returned by the server, the TV should follow the usual politics for following such redirects. (The client shall issue an HTTP GET request carrying header fields. Clients may encode additional header fields, and servers may ignore those additional header fields. The server will respond. When one of the redirect status codes is returned by the server, clients should follow the usual policies for following such redirects.)

GET request header information for resolving the deferred URI is shown in FIG. 20.

FIG. 21 is a diagram illustrating GET response information according to one embodiment of the present invention.

When a server receives a request for a deferred URI as defined in FIG. 20, the server shall react with one of the responses described with reference to FIG. 20. (When a server receives a request for a deferred URI as defined in FIG. 20, it shall react with one of the responses.)

A possible GET response status code sent by the server is shown in FIG. 21.

FIG. 22 is a diagram illustrating JSON schema for encoding a companion application URI according to one embodiment of the present invention.

When the server responds with a "200 OK" status code, the server shall deliver a JSON entity according to the JSON schema defined in FIG. 22. (When the server responds with a "200 OK" status code, it shall deliver a JSON entity according to the JSON schema defined in FIG. 22.)

This JSON schema defines that the server response consists of an array, which contains one of more objects. These objects contain two member elements: target and URI. The URI member is of a URI type and indicates the location from which the application resource can be obtained. The target member is of an enumeration type and indicates a device class being targeted by the URI member. (This JSON schema defines that the server response consists of an array, which contains one or more objects. These objects contain two member elements: target, and uri. The uri member is of the URI type, and indicates the location from which application resource can be obtained. The target member is of an enumeration type, and indicates the device class being targeted by the uri member.)

FIG. 23 is a diagram illustrating an embodiment of encoding a URI according to a companion device.

As one embodiment, to encode two URIs, where one targets smartphones and the other targets tabled devices, a JSON object like FIG. 23 might be returned. (To encode two URIs, where one targets smartphones, and the other targets tabled devices, a JSON object like the FIG. 23 might be returned.)

The device manager manages a device table. Using the device manager, the information of currently connected companion devices may be collected. At least the information defined below shall be stored in the device table. (Device Manager manages a Device Table. Using the Device Manager, the information of currently connected companion devices is collected. At least the information defined below shall be stored in the device table.)

When the device manager manages the companion device information using the device table, the status of the companion device may be added and extended later.

TABLE 15

| Data Column | Type | Information source |
|---|---|---|
| DevName | String | urn:shemas-upup-org:device:friendlyName |
| DevClass | String | urn:hbbtv-org:serviceId:hbbtv2.0clevClass1 |
| AppURI | String | urn:hbbtv-org:serviceId:hbbtv2.0appURI1 |
| DisplayIntent | String | urn:hbbtv-org:serviceId:hbbtv2.0displayIntent1 |
| IsDeferredURI | Boolean | broadcast AIT |

The following rules apply in order to manage the device table.

For management of the device table, the following rules shall apply.

1) When a new companion device becomes available, it shall be represented by an entry in the table, and the AppURI shall initially be set to the un-initialized value (for example, a null value or the empty string).

2) When a companion device ceases being available, the entry describing that device shall be invalidated.

3) When a companion application begins being signaled in the broadcast AIT, the Device Manager shall search the table for devices of matching classes. For each matching entry, it shall store the corresponding AppURI and whether it is a deferred URI in that entry.

4) When a companion application ceases being signaled in the broadcast AIT, the device manager shall search the device table for entries that reference this companion application, and shall set the AppURI to the un-initialized value (for example a null value or the empty string) in these entries.

(For management of the device table, the following rules shall apply.

1) When a new companion device becomes available, it shall be represented by an entry in the table, and the AppURI shall initially be set to the un-initialized value (for example a null value or the empty string).

2) When a companion device ceases being available, the entry describing that device shall be invalidated.

3) When a companion application begins being signaled in the broadcast AIT, the Device Manager shall search the table for devices of matching classes. For each matching entry, it shall store the corresponding AppURI and whether it is a deferred URI in that entry.

4) When a companion application ceases being signaled in the broadcast AIT, the Device Manager shall search the device table for entries that reference this companion application, and shall set the AppURI to the un-initialized value (for example a null value or the empty string) in these entries.)

In order to enable the TV to execute the HbbTV companion device application associated with the broadcast program, a plugin interface is necessary. As one embodiment, the case in which the TV receives the URI from the broadcast server will be described.

The plugin API may be provided by the HbbTV object recognized as the following MIME type.

MIME Type: application/hbbtv2.0CompanionScreen

The HbbTV application executed by the TV requires an API for notifying the HbbTV application of a companion device application when the companion device application associated with a real-time broadcast program exists. The HbbTV application also requires an API for getting a list of companion devices paired with the TV. In addition, an API for setting a URI to a companion device selected in the HbbTV application is also necessary.

An HbbTV companion screen plugin object may be defined as follows.

TABLE 16

| | Name |
|---|---|
| Property | function onCompanionScreenAppPresent(CompanionParamList params)function pointer: pointed function will be called when companion screen app associated with the current program is present |
| Method | DeviceList getPairedDeviceList( ) Boolean setCompanionUrl(DeviceParamList deviceList) |

The HbbTV application executed in the TV may or may not include a companion screen application (or a companion device application) according to the broadcast program. The embodiment of the property of the plugin object of which the HbbTV application is notified when the companion screen application exists is as follows.

Function onCompanionScreenAppPresent(CompanionParamList params)

When the HbbTV companion screen plugin object is initialized, the function may be set via the above property and, when the companion screen application exists, a registered function is called by the plugin I/F of a browser. An AppURI list suiting the type of the companion screen may be conveyed as CompanionParamList parameters. A CompanionParamList may be conveyed via the AIT.

TABLE 17

| | Name |
|---|---|
| Property method | readonly Integer length // number of Companion Params CompanionParam item(Integer index) // CompanionParam located at the corresponding index is returned |

Table 17 shows typedef collection<CompanionParam>CompanionParamList.

TABLE 18

| | Name |
|---|---|
| Property | Type (e.g., pone, pad, etc.) of String type // Companion Screen String url // App URL |

Table 18 shows CompanionParam class.

In the present embodiment, a device name, a device type and device resolution can be obtained. The application executed in the TV may call the following functions to obtain a paired device list and output the paired device list to the user, thereby enabling the user to select a specific device.

DeviceList getPairedDeviceList( )

Via this function, a list of devices paired with the TV is obtained.

TABLE 19

| | Name |
|---|---|
| Property Method | readonly Integer length // number of devices Device item(Integer index) // Device located at the corresponding index is returned |

Table 19 shows typedef collection<Device>DeviceList.

TABLE 20

| | Name |
|---|---|
| Property | Integer id // identifier of paired device String type // Paired device Type: phone, pad, etc. String status // information about status of current device |

Table 20 shows an individual instance of a paired companion device.

Next, an embodiment of an API for enabling an application executed in the TV to send an AppURI to a specific device will be described. The user may simultaneously specify one or a plurality of devices.

Boolean setCompanionUrl(DeviceParamList deviceList)

This function sends an application or a URI to a companion device specified by a deviceID.

TABLE 21

| | Name |
|---|---|
| Property | readonly Integer length // number of devices |
| Method | DeviceParam item(Integer index) // DeviceParam located at the corresponding index is returned |

Table 21 shows typedef collection<DeviceParam>DeviceParamList.

TABLE 22

| | Name |
|---|---|
| Property | Integer id // identifier of paired device<br>String url // App URL |

Table 22 shows DeviceParam class.

As another embodiment, the case in which the TV receives a URI from the server over the Internet will be described. That is, the present embodiment relates to a plugin interface provided in a TV browser environment in order to execute the TV application in the companion device.

The plugin API may be provided by the HbbTV object recognized as the following MIME type.

MIME Type: application/hbbtv2.0CompanionScreen

Via the currently connected companion device information, the HbbTV application requires an API capable of retrieving a URI corresponding to each companion device. The HbbTV application executed in the TV requires an API for notifying the HbbTV application of a companion device application when the companion device application associated with a real-time broadcast program exists. The HbbTV application also requires an API for obtaining a list of companion devices paired with the TV. In addition, an API for setting a URI to a companion device selected in the HbbTV application is also necessary.

The HbbTV companion screen plugin object may be defined as follows.

TABLE 23

| | Name |
|---|---|
| Property | function onCompanionScreenAppPresent( )function pointer: pointed function will be called when companion screen app associated with the current program is present |
| Method | DeviceList getPairedDeviceList( )<br>Boolean setCompanionUrl(DeviceParamList deviceList) |

The HbbTV application executed in the TV may or may not include a companion screen application (or a companion device application) according to the broadcast program. The embodiment of the property of the plugin object of which the HbbTV application is notified when the companion screen application exists is as follows.

Function onCompanionScreenAppPresent( )

When the HbbTV companion screen plugin object is initialized, the function may be set via the above property and, when the companion screen application exists, a registered function is called by the plugin IT of a browser. In the present embodiment, a device name, a device type and device resolution can be obtained. The application executed in the TV may call the following functions to obtain a paired device list and output the paired device list to the user, thereby enabling the user to select a specific device.

DeviceList getPairedDeviceList( )

Via this function, a list of devices paired with the TV is obtained. The HbbTV application can obtain a companion screen application URI suiting a paired device type from the server over the Internet.

TABLE 24

| | Name |
|---|---|
| Property | readonly Integer length // number of devices |
| Method | Device item(Integer index) // Device located at the corresponding index is returned |

Table 24 shows typedef collection<Device>DeviceList.

TABLE 25

| | Name |
|---|---|
| Property | Integer id // identifier of paired device<br>String type // Paired device Type: phone, pad, etc.<br>String status //information about status of current device |

Table 25 shows an individual instance of a paired companion device.

Next, an embodiment of an API for enabling an application executed in the TV to send an AppURI to a specific device will be described. The user may simultaneously specify one or a plurality of devices.

Boolean setCompanionUrl(DeviceParamList deviceList)

This function sends an application or a URI to a companion device specified by a deviceID.

TABLE 26

| | Name |
|---|---|
| Property | readonly Integer length // number of devices |
| Method | DeviceParam item(Integer index) // DeviceParam located at the corresponding index is returned |

Table 21 shows typedef collection<DeviceParam>DeviceParamList.

To be kept up to date with any companion application URIs being conveyed in the AIT, the device manager shall register with the native broadcast receiver software module of the TV platform. (To be kept up to date with any companion application URIs being conveyed in the broadcast AIT, the Device Manager shall register with the native broadcast receiver software module of the TV platform.)

Once the device manager detects a new companion application URI in a descriptor, it shall do the following.

1) The device manager shall examine all valid entries in the device table and entries with the same device class as indicated by the descriptor, and update the AppURI and IsDeferredURI columns based on the information provided in the descriptor.

2) The device manager shall become ready to accept API calls for interacting with the device table.

3) The device manager shall deliver a DOM event to the HbbTV application.

(Once the Device Manager detects a new companion application URI in a descriptor, it shall do the following.

1) It shall examine all valid entries in the device table, and for entries with the same device class as indicated by the descriptor, it shall update the AppURI and IsDeferredURI columns based on the information provided in the descriptor.

If the device class indicated in the descriptor is "all devices", then all valid entries in the device table shall be updated.

2) It shall become ready for accepting API calls for interacting with the device table.

3) It shall deliver a DOM event to the HbbTV application.)

The device manager generates the following DOM 3 event in order to indicate the HbbTV application for the device capable of utilizing the companion application. A method of utilizing such information in the HbbTV application will be described in detail below.

TABLE 27 enum HbbtvCompanionClass { "All", "Phone", "Tablet", "TV", "PC" };interface HbbtvCompanionAppAvailable : CustomEvent{ readonly attribute unsigned long numDevices; getter HbbtvCompanionClass class(unsigned long index); getter DOMString name(unsigned long index);};

Table 27 shows WebIDL definition of the HbbtvCompanionAppAvailable event.

The DOM 3 event property of such an event is set as follows.

TABLE 28

| Property | Type | Value |
|---|---|---|
| type | DOMString | HbbtvCompanionAppAvailable |
| target | EventTarget | Root element of the DOM tree |
| bubbles | boolean | false |
| cancelable | boolean | false |
| isTrusted | boolean | true |

Table 28 shows DOM 3 event property settings for HbbtvCompanionAppAvailable event.

For generating HbbtvCompanionAppAvailable events, the following rules shall apply.

1) When a companion application begins being signaled in the AIT, the device manager shall consult the device table for devices with matching device classes.

2) If one or more devices of matching classes are found, the device manager shall store the respective URIs in the device table, and generate an HbbTVCompanionAppAvailable event conveying the names and classes of the matching devices.

3) When a companion application ceases being signaled in the AIT, the device manager shall generate an HbbTVCompanionAppAvailable event with numDevices set to zero to indicate that a companion application can no longer be launched.

4) If, during the period when a companion application is being signaled in the AIT, suitable companion devices become available, or cease being available, the device manager shall generate an HbbTVCompanionAppAvailable event conveying an updated list of suitable companion devices.

(For generating HbbtvCompanionAppAvailable events, the following rules shall apply.

1) When a companion application begins being signaled in the broadcast AIT, the Device Manager shall consult the device table for devices with matching device classes.

2) If one or more devices of matching classes are found, the Device manager shall store the respective URIs in the device table, and generate an HbbTVCompanionAppAvailable event conveying the names and classes of the matching devices.

3) When a companion application ceases being signaled in the broadcast AIT, the Device Manager shall generate an HbbTVCompanionAppAvailable event with numDevices set to zero to indicate that a companion application can no longer be launched.

4) If, during the period when a companion application is being signaled in the broadcast AIT, suitable companion devices become available, or cease being available, the Device Manager shall generate an HbbTVCompanionAppAvailable event conveying an updated list of suitable companion devices.)

HbbTV applications that wish to make use of companion device applications should register an event handler for the HbbtvCompanionAppAvailable event. When the event is generated, the HbbTV application will receive information about the number of devices which can launch a companion application, their device classes, and their names. This information may for example be used to present the user with a choice as to whether he would like to launch the companion application, and if so on which device (if more than one device is available). After the HbbTV application has decided whether to launch the companion application, it uses the API to instruct the device manager to launch the application on the specified device. (HbbTV applications that wish to make use of companion device applications should register an event handler for the HbbtvCompanionAppAvailable event. When the event is generated, the HbbTV application will receive information about the number of devices which can launch a companion application, their device classes, and their names. This information may for example be used to present the user with a choice as to whether he would like to launch the companion application, and if so on which device (if more than one device is available). After the HbbTV application has decided whether to launch the companion application, it uses the API to instruct the Device Manager to launch the application on the specified device.)

TABLE 29

| Interface/Class | Method |
|---|---|
| HbbTVDeviceManager | Boolean launchDefaultUriOnDeviceNamed(String name) String getDeferredUriForDeviceNamed(String name) String setDefaultUriForDeviceNamed(String name, String uri) String setDisplayIntentForDeviceNamed(String name, String intent) void deviceTableUpdateCompleted(void) Collection getDeviceCollection(void) |

Table 29 shows a device manager API.

An embodiment of using a device manager API is as follows.

TABLE 30

<script>function myCompanionTrigger (e) { if (!e) var e = window.event // e refers to the event if (e.numDevices) num = e.numDevices;
// resolve deferred URIs (if any) var deferredURI; var finalURI; var resolutionOccurred = 0; for (var i=0; i<num; i++) { deferredURI = getDeferredUriForDeviceNamed(e.name(i)); if (deferredURI.length >0) { finalURI = myMagicallyResolve(deferredURI, e.class(i)); setDefaultUriForDeviceNamed(e.name(i), finalURI);

TABLE 30-continued resolutionOccurred = 1; } } if (resolutionOccurred)
{ deviceTableUpdateCompleted( ); // will trigger new event
return false; // cancel old event } // this part only reached if all
URIs are final for (var i=0; i<num; i++)
{ document.writer("" + e.name(i) + "' is a ' + e.class(i));
target = i; // or let the user pick a device } return
launchDefaultUriOnDeviceNamed(e.name(target));}</script> launchDefaultUriOnDeviceNamed Method
Table 31

TABLE 31

Boolean launchDefaultUriOnDeviceNamed(String name)

| | | |
|---|---|---|
| Parameters | name | The device's name as reported in the HbbtvCompanionAppAvailable event. |
| Return value | | True, if the name was found in the device table, the AppURI was not the un-initialzed value, and IsDeferredURI was not set (i.e. the application could be launched). False otherwise. |

When this method is invoked, the device manager searches for the name of the device in the DevName column of the device table. If an entry is found, it checks whether the AppURI column has been set, and whether the IsDeferredURI flag is cleared. If all conditions are met, the device manager will use UPnP messages to set the AppURI state variable on the named companion device. (When this method is invoked, the Device Manager searches for the name of the device in the DevName column of the device table. If an entry is found, it checks whether the AppURI column has been set (i.e. is not set to the un-initialized value), and whether the IsDeferredURI flag is cleared. If all conditions are met the Device Manager will use UPnP messages to set the AppURI state variable on the named companion device.)

getDeferredUriForDeviceNamed Method

TABLE 32

String getDeferredUriForDeviceNamed(String name)

| | | |
|---|---|---|
| Parameters | name | The device's name as reported in the HbbtvCompanionAppAvailable event. |
| Return value | | If the IsDeferredURI flag is set in the device table, returns the content of the AppURI column. Otherwise returns the un-initialized value. |

When this method is invoked, the device manager searches for the name of the device in the DevName column of the device table. If an entry is found, it checks whether the IsDeferredURI flag is set. If all conditions are met, it returns the content of the AppURI column. Otherwise it returns the un-initialized value. (When this method is invoked, the Device Manager searches for the name of the device in the DevName column of the device table. If an entry is found, it checks whether the IsDeferredURI flag is set. If all conditions are met, it returns the content of the AppURI column. Otherwise it returns the un-initialized value.)

setDefaultUriForDeviceNamed Method

TABLE 33

String setDefaultUriForDeviceNamed(String name, String uri)

| | | |
|---|---|---|
| Parameters | name | The device's name as reported in the HbbtvCompanionAppAvailable event. |
| | URI | The new content to be stored in the AppURI column. |
| Return value | | The previous content of the AppURI column. |

When this method is invoked, the device manager searches for the name of the device in the DevName column of the device table. If an entry is found, the device manager stores the given URI in the AppURI column, and returns the previous content. Any URI provided must not be a deferred URI, and therefore this method will also clear the IsDeferredURI flag. (When this method is invoked, the Device Manager searches for the name of the device in the DevName column of the device table. If an entry is found, it stores the given URI in the AppURI column, and returns the previous content. Any URI provided must not be a deferred URI, and therefore this method will also clear the IsDeferredURI flag.)

setDisplayIntentForDeviceNamed Method

TABLE 34

String setDisplayIntentForDeviceNamed (String name, String intent)

| | | |
|---|---|---|
| Parameters | name | The device's name as reported in the HbbtvCompanionAppAvailable event. |
| | intent | The new display intent to use when launching the URI. |
| Return value | | The previous content of the DisplayIntent column. |

When this method is invoked, the device manager searches for the name of the device in the DevName column of the device table. If an entry is found, the device manager stores the given intent in the DisplayIntent column, and returns the previous content. Any intent provided must either be "WebView" or "SystemBrowser". If "WebView" is specified, the companion device may launch the URI in a WebView that is embedded into the companion app. In all other cases, the companion device shall launch the URI in the default Web browser of the system. (When this method is invoked, the Device Manager searches for the name of the device in the DevName column of the device table. If an entry is found, it stores the given intent in the DisplayIntent column, and returns the previous content. Any intent provided must either be "WebView" or "SystemBrowser". If "WebView" is specified, the companion device may launch the URI in a WebView that is embedded into the companion app. In all other cases, the companion device shall launch the URI in the default Web browser of the system.)

deviceTableUpdateCompleted Method

TABLE 35 void deviceTableUpdateCompleted(void)

| | |
|---|---|
| Parameters | none |
| Return value | none |

This method informs the device manager that the HbbTV application has finished updating the device table. The device manager will allow a very short delay for the application's event handler to cancel the current event before generating a new event with the updated information. Event handlers should therefore call return immediately after calling this method. The new event will convey information about all devices for which a non-deferred companion application URI is available in the device table, just as if it had been provided in an AIT. (This method informs the Device Manager, that the HbbTV application has finished updating the device table. The Device Manager will allow a very short delay for the application's event handler to cancel the current event before generating a new event with the updated information. Event handlers should therefore call return(false) immediately after calling this method. The new event will convey information about all devices for which a non-deferred companion application URI is available in the device table, just as if it had been provided in a broadcast AIT.)

getDeviceCollection Method

TABLE 36

| Collection getDeviceCollection(void) | |
|---|---|
| Parameters | none |
| Return value | A read-only collection suitable for use with any of the iterator constructs. |

This method returns a read-only copy of the current device table for browsing. Elements thereof have two members: name and class. Both are strings. Name contains the device's name, and class contains a device class from the HbbtvCompanionClass enum type. (This method informs returns a read-only copy of the current device table for browsing. Its elements have two members: name and class. Both are strings. Name contains the device's name, and class contains a device class from the HbbtvCompanionClass enum type.)

Direct communication between the browser and the UPnP unit may be difficult. Accordingly, the device manager may be responsible for interfacing between the browser and the UPnP unit. The device manager may serve as a daemon in communication between the UPnP unit and the browser via the API of the browser. Although the daemon may be included in the browser, a standalone daemon may be implemented as one module of the TV.

Figure 24:
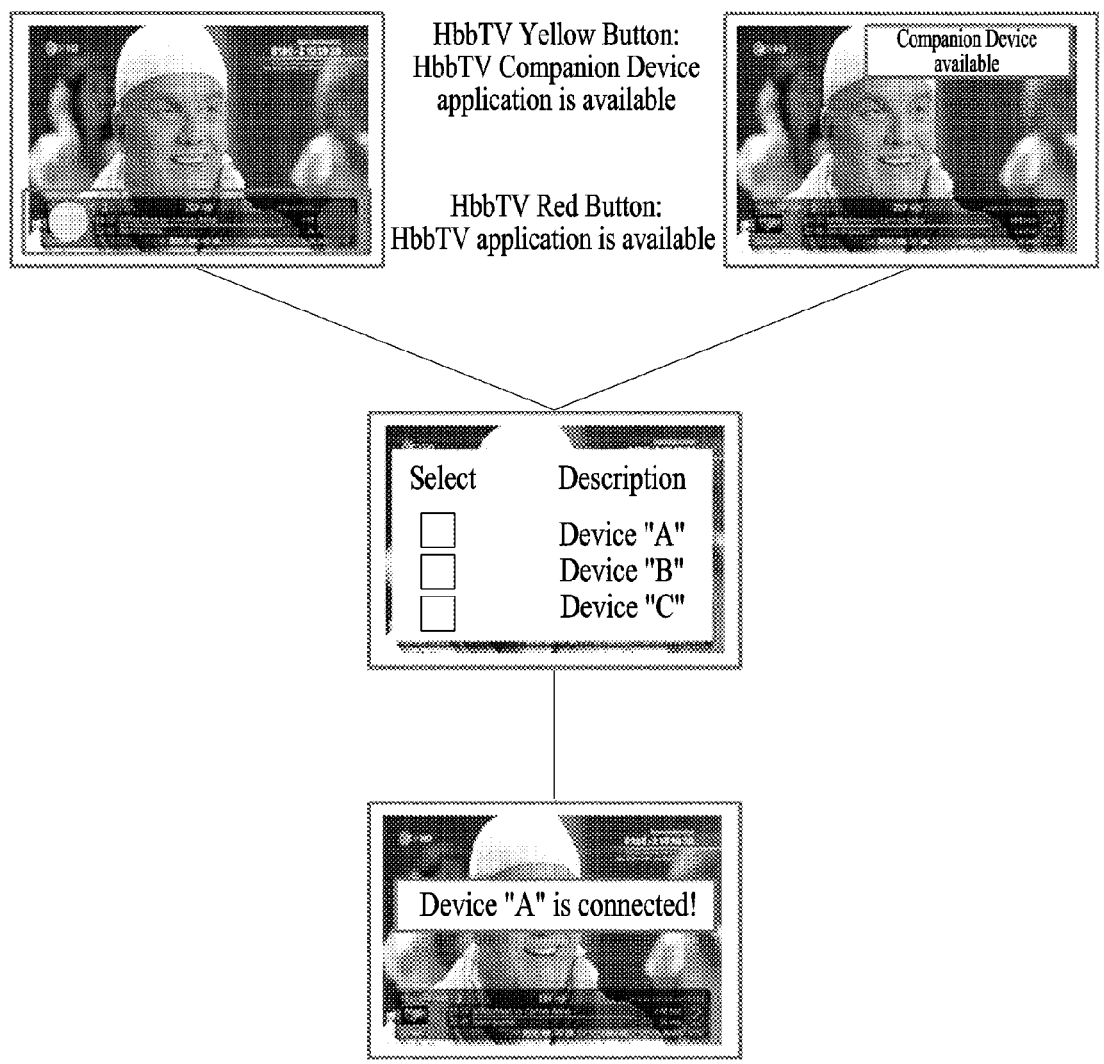
FIG. 24 is a diagram illustrating a UI of a signal transmission apparatus for executing an additional service in a companion device according to one embodiment of the present invention.

FIG. 24 is a diagram illustrating a UI of a signal transmission apparatus for executing an additional service in a companion device according to one embodiment of the present invention.

The signal transmission apparatus may be connected to the companion device as described above to receive a URI according to type from an AIT or a server and generate a device table. The signal transmission apparatus may display an additional service on a screen when the additional service (or a companion device application) available in the companion device exists in the broadcast program. As one embodiment, the signal transmission apparatus may display a red button when an available HbbTV application exists. The Hbb application means an application executed in a TV. The signal transmission apparatus may display a yellow button when an available HbbTV companion device application exists or may display information indicating that the companion device is available in one region of a screen. The HbbTV companion device application means an application executed in a companion device.

When a user selects execution of a companion device application, the signal transmission apparatus may display a list of discovered available companion devices. When a user selects a device A, the signal transmission apparatus may transmit the URI of a server in which a resource is located to the device A, for an additional service, and output a message indicating that the device A is connected.

The device A may be connected to the server using the URI received from the signal transmission apparatus to execute the additional service.

Figure 25:
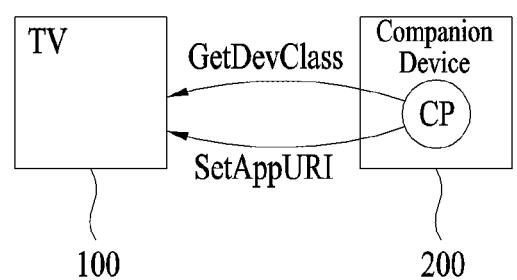
FIGS. 25 to 26 are diagrams illustrating a method of, at a signal transmission apparatus, executing an additional service of a companion device according to various embodiments of the present invention.

FIG. 25 is a diagram illustrating a method of, at a signal transmission apparatus, executing an additional service of a companion device according to one embodiment of the present invention.

To allow companion devices to launch broadcast-independent HbbTV applications on the signal transmission apparatus (e.g., TV) 100, the signal transmission apparatus 100 may also implement the UPnP state variable services defined in FIG. 8. (To allow companion devices to launch broadcast-independent HbbTV applications on the TV, TV devices may also implement the UPnP state variable services defined in FIG. 8.)

The configuration shown in FIG. 25 depicts the UPnP services that may be offered by the TV. Since companion devices may not be able to receive the broadcast AIT, they may use other mechanisms. (The configuration shown in FIG. 25 depicts the UPnP services that may be offered by the TV. Since companion devices may not be able to receive the broadcast AIT, they may use other mechanisms.)

The configuration of FIG. 25 may be implemented similarly to the method described with reference to FIG. 4.

Figure 26:
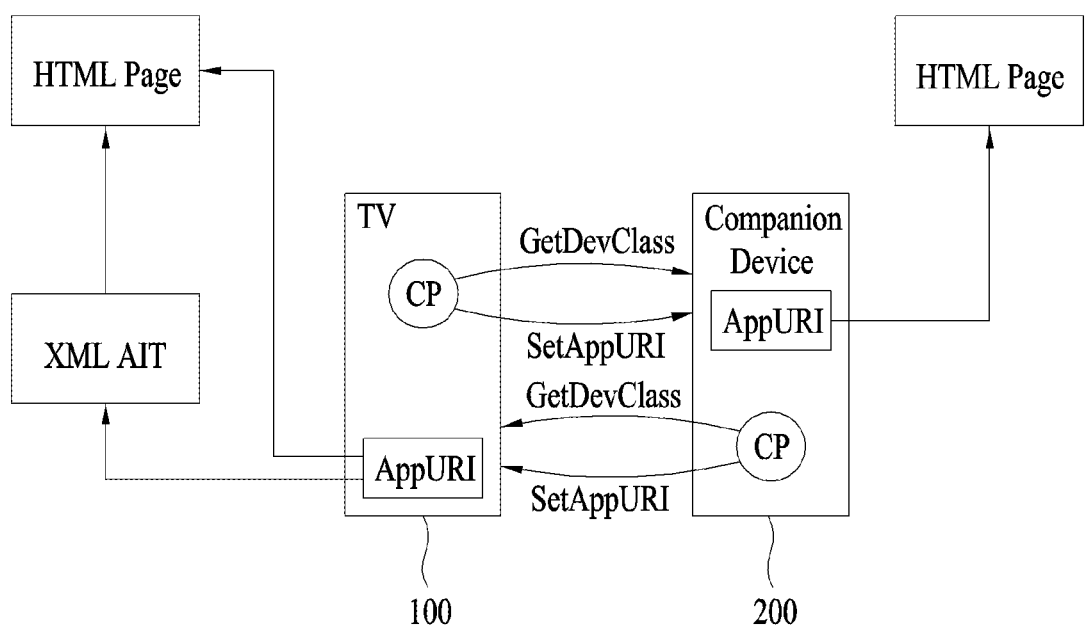

FIG. 26 is a diagram illustrating a method of, at a signal transmission apparatus, executing an additional service of a companion device according to another embodiment of the present invention.

FIG. 26 shows an embodiment in which a CP is located in both the signal transmission apparatus (e.g., TV) 100 and the companion device 200.

The AppURI that is conveyed to the TV 100 either points to an XML AIT, or to an HTML page. The TV 100 shall follow rules for determining priorities and behavior when a launch request for a broadcast-independent HbbTV application is received from a companion device. (The AppURI that is conveyed to the TV either points to an XML AIT, or to an HTML page. TV devices shall follow rules for determining priorities and behavior when a launch request for a broadcast-independent HbbTV application is received from a companion device.)

Figure 27:
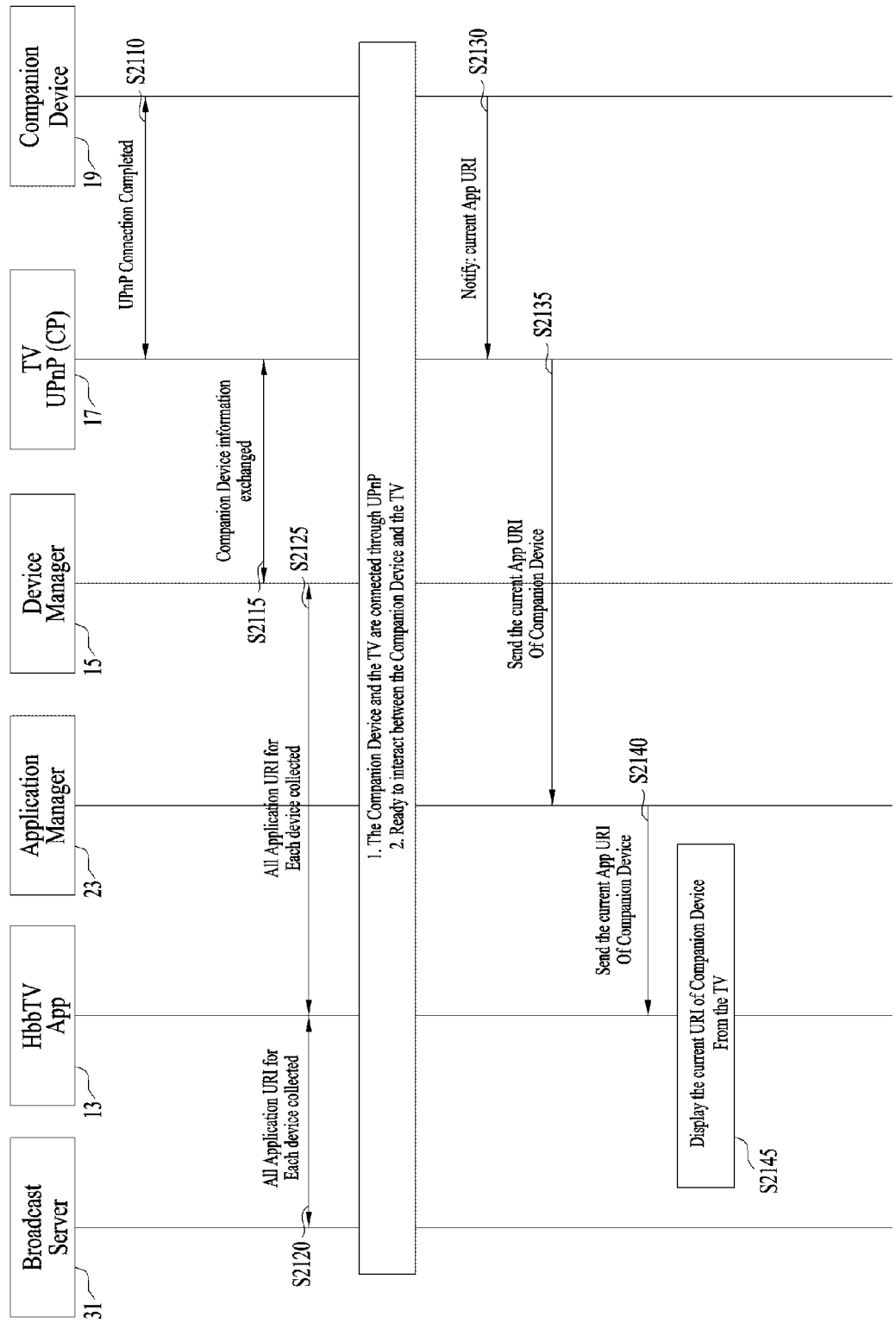
FIG. 27 is a timing chart illustrating a method of, at a signal transmission apparatus, executing an additional service of a companion device according to a first embodiment of the present invention.

FIG. 27 is a timing chart illustrating a method of, at a signal transmission apparatus, executing an additional service of a companion device according to a first embodiment of the present invention.

Referring to FIG. 27, the TV, which is the CP, performs discovery using a multicast method to companion devices via the UPnP unit 17 to be connected to the companion devices (S2110). The UPnP unit 17 of the TV receives device information from the companion device and conveys the device information to the device manager 15 (S2115). The device manager 15 manages companion device information using the device table and sends all the collected applications URI for the companion devices to the HbbTV application 13. The HbbTV application 13 receives all the collected application URIs for the companion devices from the server 31 (S2120). The Hbb application 13 sends the received application URIs to the device manager 15 (S2125).

The companion device and the TV are connected via the UPnP unit. Interaction between the companion device and the TV is prepared.

When the user selects delivery of the companion device application to the TV, the companion device 19 notifies the TV of the current application URI via the UPnP unit (S2130). The UPnP unit 17 of the TV sends the current application URI of the companion device to the application manager 23 (S2135). The application manager 23 sends the current application URI of the companion device to the HbbTV application 13 (S2140). The HbbTV application 13 displays the current URI of the companion device on the TV (S2145).

That is, the TV, which is the CP, begins the discovery process by broadcasting a multicast search to the companion devices via the UPnP unit. When discovery of the companion devices is completed, the TV sends a control signal "Get" for obtaining the device type of the companion device to the companion device. The companion device conveys the device information in response to the control signal. The conveyed device information is conveyed to the device table of the device manger to manage the device ID and the device type. When connection between the TV and the companion device is completed, communication is prepared.

When the user selects delivery of the companion device application to the TV, the companion device notifies the TV of the current URI via the UPnP unit. The UPnP unit of the TV receives and sends the URI to the application manager. At this time, the following two cases may occur.

First, when the HbbTV application of the TV is not executed, the application manager launches the HbbTV application and executes the received URI on the HbbTV application.

Next, when the HbbTV application of the TV is executed, the application manager sends the URI to the HbbTV application and enables the user to identify whether the URI received from the companion device may be executed using a popup window.

The device information may include information about device type of the companion device. The TV is a control point (CP) of the UPnP unit. As one embodiment, the UPnP device type of the HbbTV 2.0 receiver is a urn:hbbtv.org:device:hbbtv2.0rcvr. In some cases, in order to form the Namespace Identifier (NID) prefix, the DNS name of hbbtv.org is converted to hbbtv-org as required by RFC 2141. The remaining part after hbbtv-org is therefore the Namespace Specific String (NSS). The HbbTV 2.0 receiver supports a CurrentURI having the following service type and service ID.

TABLE 37

| Service | Service Type | Service ID |
|---|---|---|
| CurrentURI | hbbtv2.0cururi:1 | urn:hbbtv.org:serviceid:hbbtv2.0cururi1 |

The CurrentURI service refers to a service for, at the companion device, notifying the TV, which is the CP, of the URI of the application currently executed in the companion device. The URI corresponding to the companion device selected by the user is obtained via the HbbTV application and is sent to the companion device via Set Control.

TABLE 38

| Variable name | Req(uired) or Opt(ional) | Data | Evented? |
|---|---|---|---|
| CurrentURI | Req | String | Yes |

Table 38 shows a CurrentURI service state variable.

TABLE 39

| Name | Req(uired) or Opt(ional) |
|---|---|
| SetCurrentURI | Req |

Table 39 shows CurrentURI service actions.

TABLE 40

| Arguement | Direction | Related state variable |
|---|---|---|
| CurrentURI | IN | CurrentURI |

Table 40 shows Argument of a SetCurrentURI action.

Figure 28:
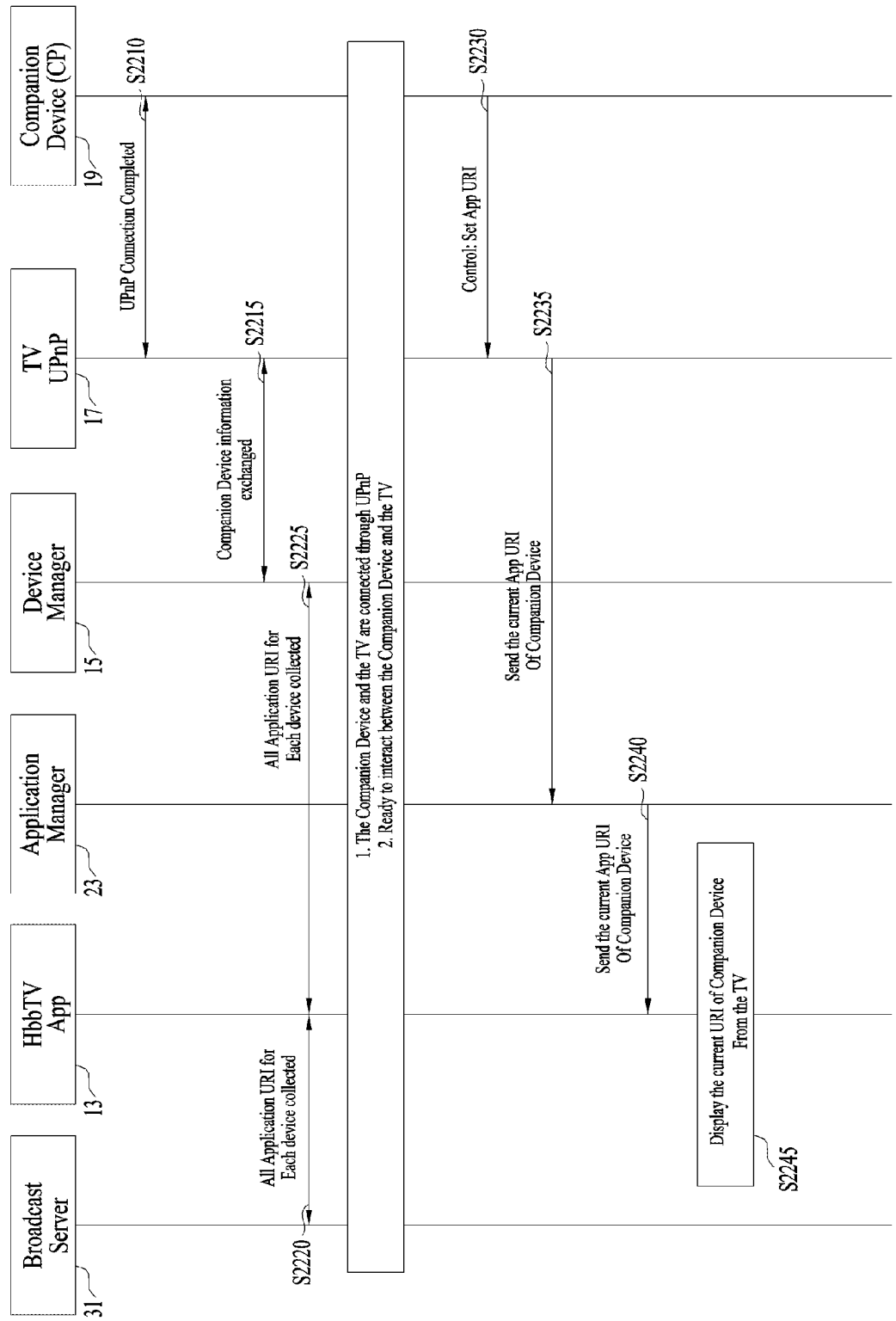
FIG. 28 is a timing chart illustrating a method of, at a signal transmission apparatus, executing an additional service of a companion device according to a second embodiment of the present invention.

FIG. 28 is a timing chart illustrating a method of, at a signal transmission apparatus, executing an additional service of a companion device according to a second embodiment of the present invention.

Referring to FIG. 28, the companion device, which is the CP, performs discovery using a multicast method to the TV via the UPnP unit 17 to be connected to the TV (S2210). The UPnP unit 17 of the TV receives device information from the companion device and conveys the device information to the device manager 15 (S2215). The device manager 15 manages companion device information using the device table and conveys the collected companion device information to the HbbTV application 13. The HbbTV application 13 receives all application URIs for the companion devices from the server 31 (S2220). The Hbb application 13 sends the received application URIs to the device manager 15 (S2225).

The companion device and the TV are connected via the UPnP unit. Interaction between the companion device and the TV is prepared.

When the user selects delivery of the companion device application to the TV, the companion device 19 transmits a control signal "Set application URI" to the TV via the UPnP unit (2230). The UPnP unit 17 of the TV sends the current application URI of the companion device to the application manager 23 (S2235). The application manager 23 sends the current application URI of the companion device to the HbbTV application 13 (S2240). The HbbTV application 13 displays the current URI of the companion device on the TV (S2245).

That is, the companion device, which is the CP, begins the discovery process by broadcasting a multicast search to the TV via the UPnP unit. When discovery of the TV is completed, the companion device sends a control signal "Set" for setting the device type of the companion device to the TV. The TV conveys the set device information to the device table of the device manager. The device manager manages the device ID and the device type. When connection between the TV and the companion device is completed, communication is prepared.

When the user selects delivery of the companion device application to the TV, the companion device transmits a control signal "Set" for setting the current URI to the TV via the UPnP unit. The UPnP unit of the TV receives and sends the URI to the application manager. At this time, the following two cases may occur.

First, when the HbbTV application of the TV is not executed, the application manager launches the HbbTV application and executes the received URI on the HbbTV application.

Next, when the HbbTV application of the TV is executed, the application manager sends the URI to the HbbTV application and enables the user to identify whether the URI received from the companion device may be executed using a popup window.

The device information may include information about device type of the companion device. The TV is a control point (CP) of the UPnP unit. As one embodiment, the UpnP device type of the HbbTV 2.0 receiver is a urn:hbbtv.org:device:hbbtv2.0rcvr. In some cases, In order to form the Namespace Identifier (NID) prefix, the DNS name of hbbtv.org has been converted to hbbtv-org as required by RFC 2141. The remaining part after hbbtv-org is therefore the Namespace Specific String (NSS). The HbbTV 2.0 receiver supports the following Devinfo service and AppURI service having the service type and the service ID.

TABLE 41

| Service | Service Type | Service ID |
|---|---|---|
| CurrentURI | hbbtv2.0cururi:1 | urn:hbbtv.org:serviceid:hbbtv2.0cururi1 |

The CurrentURI service refers to a service for sending the URI launching the application from the TV to the companion device, which is the CP. The URI corresponding to the companion device selected by the user is obtained via the HbbTV application and the companion device is notified of the received URI via the UPnP unit.

TABLE 42

| Variable name | Req(uired) or Opt(ional) | Data | Evented? |
|---|---|---|---|
| CurrentURI | Req | String | NO |

Table 42 shows a CurrentURI Service state variable.

TABLE 43

| Name | Req(uired) or Opt(ional) |
|---|---|
| NotifyCurrentURL | Req |

Table 43 shows CurrentURL Service Actions.

TABLE 44

| Arguement | Direction | Related state variable |
|---|---|---|
| CurrentURI | OUT | CurrentURI |

Table 44 shows Argument of a NotifyCurrentURL action.

Figure 29:
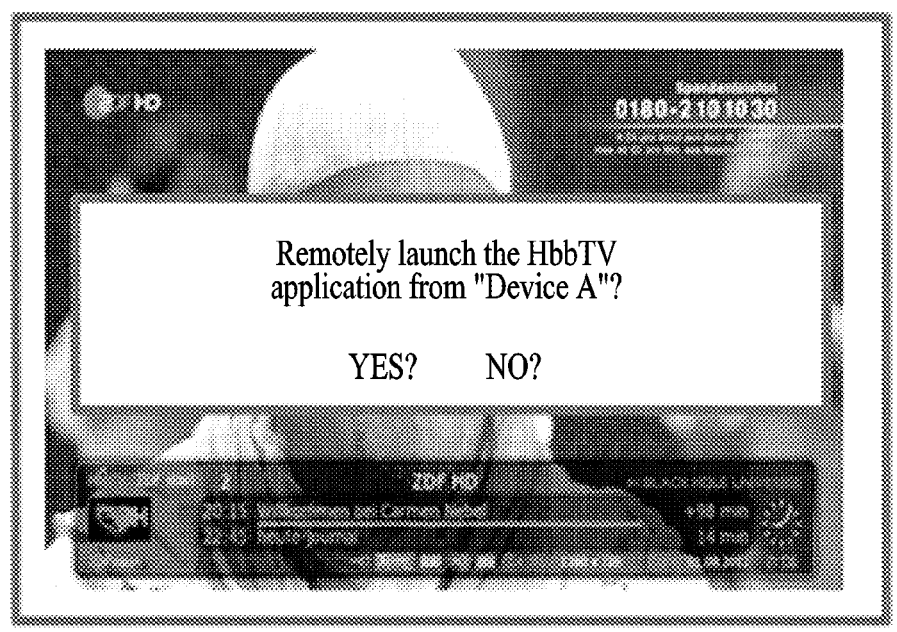
FIG. 29 is a diagram illustrating a UI of a signal transmission apparatus for executing an additional service of a companion device according to one embodiment of the present invention.

FIG. 29 is a diagram illustrating a UI of a signal transmission apparatus for executing an additional service of a companion device according to one embodiment of the present invention.

The TV and the companion device are connected via the discovery process and the TV may receive and manage the application URI related to the companion device. This has been described with reference to FIGS. 27 and 28 and a detailed description thereof will be omitted.

The user selects execution of the companion device application in the TV. At this time, when the TV executes the HbbTV application, execution of the received URI may be confirmed by the user. A popup window may be used to confirm execution of the received URI.

Figure 30:
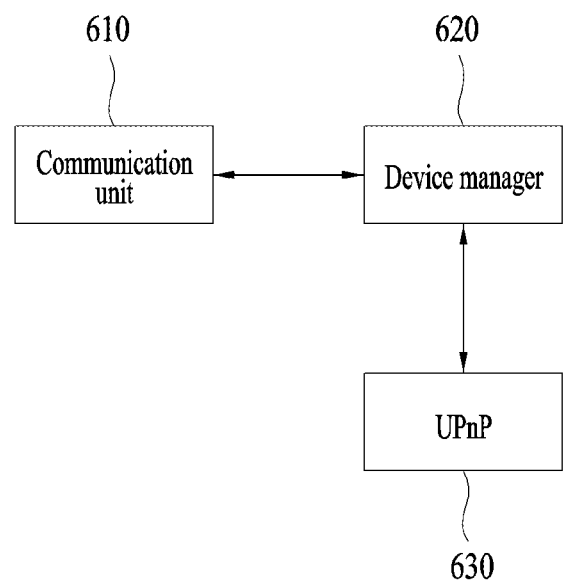
FIG. 30 is a block diagram showing a signal transmission apparatus according to one embodiment of the present invention.

FIG. 30 is a block diagram showing a signal transmission apparatus according to one embodiment of the present invention.

Referring to FIG. 30, the signal transmission apparatus includes a communication unit 610, a device manager 620 and an UPnP unit 630.

The communication unit 610 may receive an application URI. The application URI may mean location information of the connection server where an additional service (or a companion device application) may be executed in a companion device. The communication unit 610 may include a broadcast reception module and the broadcast reception module may receive an AIT including an application URI. In the above-described embodiment, the CP is located in the TV, which has been described with reference to FIGS. 8 and 14 to 23. The embodiment in which the CP is located in the companion device has been described with reference to FIGS. 9 and 14 to 23.

The communication unit 610 may include a broadcast reception module and a browser module. In this case, the broadcast reception module may receive an AIT containing a deferred URI and the browser module may access a server corresponding to the deferred URI via an HbbTV application and receive an application URI corresponding to device type information. In the above-described embodiment, the CP is located in the TV, which has been described with reference to FIGS. 10 and 15 to 23. The embodiment in which the CP is located in the companion device has been described with reference to FIG. 9.

In addition, the communication unit 610 may include a browser module and the browser module may perform communication with a server via an HbbTV application, identify whether the companion device application is available, and receive and store an application URI corresponding to device type information of a companion device selected by a user from the server. In the above-described embodiment, the CP is located in the TV, which has been described with reference to FIG. 12. The embodiment in which the CP is located in the companion device has been described with reference to FIG. 13.

The device manager 620 may store the application URI in correspondence with the device type information and identify the device type information of the companion device selected by the user. When the application URI is received via the AIT, the device manager 620 may parse the received AIT and detect and store the application URI corresponding to the device type information.

The API related to calling of the device manager 620 or the event for the HbbTV application has been described with reference to FIG. 23.

The UPnP unit 630 may discover the companion device using a multicast method and receive device type information from the discovered companion device. In this case, the UPnP unit 630 of the TV operates as the CP. The UPnP unit 630 may transmit the application URI corresponding to the device type information to the selected companion device.

The companion device may output an application URI page received using a basic browser or web view unit.

Figure 31:
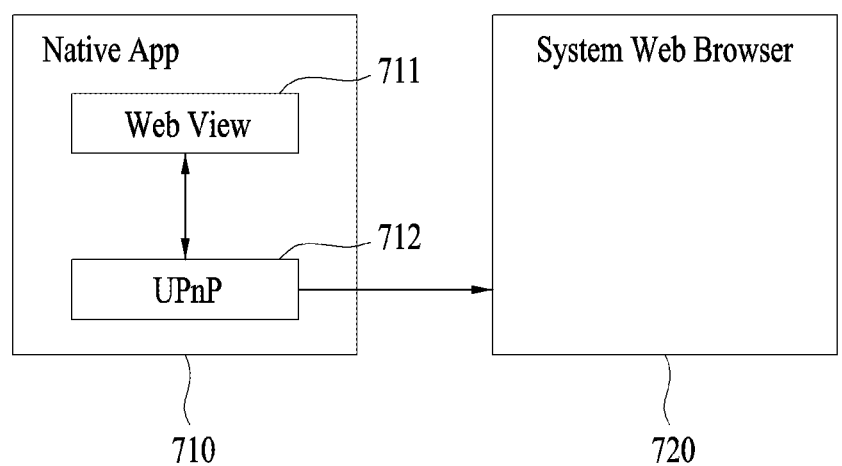
FIG. 31 is a block diagram showing a companion device according to one embodiment of the present invention.

FIG. 31 is a block diagram showing a companion device according to one embodiment of the present invention.

Referring to FIG. 31, the companion device may include a native application 710 and a system web browser 720. The native application 710 may include a web view unit 711 and a UPnP unit 712.

The native application 710 runs on the companion device and may provide UPnP operation. In addition, the native application may provide a web view unit for loading and executing the companion application.

The system web browser 720 runs on the companion device and may be a standard web browser set in the companion device. Unlike the web view unit 711 selectively provided by the native application 710, the system web browser 720 may be a general web browser suitable for general web usage.

The UPnP unit 712 may be connected to the UPnP unit of the signal transmission apparatus to perform communication and the web view unit 711 may display an additional service provided by the server of the accessed URI.

When combining the features, several combinations are possible according to a location where UPnP Control Points are located, and a location where services for accessing state variables are provided. To ensure a minimum level of interoperability and user experience, all TV sets, and all companion devices shall implement one of the profiles defined below. (When combining the features, several combinations are possible according to a location where UPnP Control Points are located, and a location where services for accessing state variables are provided. To ensure a minimum level of interoperability and user experience, all TV sets, and all companion devices shall implement one of the profiles defined below.)

TABLE 45

| | Device Profile | ControlPoint | DevClassservice | AppURIservice |
|---|---|---|---|---|
| TV set | Basic TV | * | — | — |
| | TV with remote launch capability | * | * | * |
| Companiondevice | Basic companion | — | * | * |
| | Companion with remote launch capability | * | * | * |

With these profiles, the functionalities as shown below will be possible. (With these profiles, the functionalities as shown below will be possible.)

TABLE 46

| | Basic companion | Companion with remote launch |
|---|---|---|
| Basic TV | TV launches app on companion. | TV launches app on companion. |
| TV with remote launch | TV launches app on companion. | TV launches app on companion. Companion launches HbbTV app on TV. |

The UPnP protocol, as default, does not implement any authentication, so UPnP device implementations will implement their own authentication mechanisms, or implement the Device Protection Service. Many UPnP device implementations lack authentication mechanisms, and by default assume local systems and their users are completely trustworthy. Mandating a specific security profile of UPnP could hence severely limit interoperability. (The UPnP protocol, as default, does not implement any authentication, so UPnP device implementations will implement their own authentication mechanisms, or implement the Device Protection Service. Many UPnP device implementations lack authentication mechanisms, and by default assume local systems and their users are completely trustworthy. Mandating a specific security profile of UPnP could hence severely limit interoperability.)

The signal transmission apparatus and method according to the present invention is not limited to the configurations and methods of the above-described embodiments and all or some of the embodiments may be selectively combined to obtain various modifications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Such modifications should not be individually understood from the technical spirit or prospect of the present invention.

MODE FOR INVENTION

Industrial Applicability

The present invention is applicable to a broadcast and video signal processing.

The invention claimed is:

1. A signal transmission method comprising:
   discovering a companion device using a multicast method;
   receiving and storing device type information from the discovered companion device;
   receiving and an application information table including an application uniform resource identifier, URI, in correspondence with the device type information;
   parsing the received application information table;
   detecting and storing the application URI corresponding to the device type information; and
   identifying the device type information of a companion device selected by a user and transmitting the application URI corresponding to the device type information to the selected companion device.

2. The signal transmission method according to claim 1, wherein the method includes receiving an application information table including a deferred URI, parsing the received application information table to detect the deferred URI, accessing a server corresponding to the deferred URI, and receiving and storing the application URI corresponding to the device type information.

3. The signal transmission method according to claim 1, wherein the method includes performing communication with a server via an HbbTV application to identify whether a companion device application is available and receiving and storing the application URI corresponding to the device type information of the companion device selected by the user from the server.

4. The signal transmission method according to claim 1, wherein the application URI is a specific URI in which a different URI value is assigned to each companion device or a generic URI in which the same URI value is assigned to all companion devices.

5. A signal transmission apparatus comprising:
   a discovery unit configured to discover a companion device using a multicast method and to receive type information from the discovered companion device;
   a communication unit configured to receive an application information table including an application uniform resource identifier, URI; and a device manager configured to parse the received application information table, detect the application URI, store the application URI in correspondence with the device type information and identify the device type information of a companion device selected by a user, wherein the discovery unit transmits the application URI corresponding to the device type information to the selected companion device.

6. The signal transmission apparatus according to claim 5, wherein:

the communication unit includes a broadcast reception module and a browser module, the broadcast reception module receives an application information table including a deferred URI, the device manager parses the received application information table to detect the deferred URI, and the browser module accesses a server corresponding to the deferred URI via an HbbTV application and receives the application URI corresponding to the device type information.

7. The signal transmission apparatus according to claim 5, wherein:

the communication unit includes a browser module, the browser module performs communication with a server via an HbbTV application, identifies whether a companion device application is available, and receives and stores the application URI corresponding to the device type information of the companion selected by the user from the server.

8. The signal transmission apparatus according to claim 5, wherein the application URI is a specific URI in which a different URI value is assigned to each companion device or a generic URI in which the same URI value is assigned to all companion devices.

9. A signal transmission and reception system comprising:

a signal transmission apparatus configured to discover a companion device using a multicast method and to transmit a control signal for requesting device type information to the discovered companion device; and the companion device configured to transmit the device type information to the signal transmission apparatus, wherein the signal transmission apparatus receives an application information table including an application URI, parses the received application information table, detects the application URI, stores the application URI in correspondence with the device type information, identifies the device type information of a companion device selected by a user, and transmits the application URI corresponding to the device type information to the selected companion device, and wherein the companion device receives the application URI from the signal transmission apparatus and receives and displays a URI page from a server corresponding to the application URI.

10. The transmission and reception system according to claim 9, wherein the signal transmission apparatus receives and parses an application information table including a deferred URI to detect the deferred URI, accesses a server corresponding to the deferred URI via an HbbTV application, and receives the application URI corresponding to the device type information.

11. The signal transmission and reception system according to claim 9, wherein the signal transmission apparatus performs communication with a server via an HbbTV application to identify whether a companion device application is available and receives and stores the application URI corresponding to the device type information of the companion device selected by the user from the server.

12. A signal transmission and reception system according to claim 9, wherein the application URI is a specific URI in which a different URI value is assigned to each companion device or a generic URI in which the same URI value is assigned to all companion devices.

* * * * *